United States Patent [19]

Tomii et al.

[11] Patent Number: 4,920,410
[45] Date of Patent: Apr. 24, 1990

[54] DRIVE METHOD FOR SYNCHRONIZING SCANNING AND MODULATION OF FLAT-CONFIGURATION COLOR CRT

[75] Inventors: Kaoru Tomii, Isehara; Hiroshi Miyama, Yokohama; Yoshikazu Kawauchi, Kawasaki; Jun Nishida, Tokyo, all of Japan

[73] Assignee: Matsushita Electric Industrial Co., Ltd., Osaka, Japan

[21] Appl. No.: 185,628

[22] Filed: Apr. 25, 1988

[30] Foreign Application Priority Data

| Apr. 24, 1987 | [JP] | Japan | 62-102255 |
| Apr. 27, 1987 | [JP] | Japan | 62-103501 |
| Aug. 6, 1987 | [JP] | Japan | 62-196716 |

[51] Int. Cl.$^5$ ............................................. G09G 1/00
[52] U.S. Cl. .......................................... 358/67; 358/69; 340/703
[58] Field of Search ................. 340/701, 814, 703; 358/67, 69, 59

[56] References Cited

U.S. PATENT DOCUMENTS

| 3,939,486 | 2/1976 | Tomii | 358/67 |
| 4,194,140 | 3/1980 | Hamano et al. | 358/69 |
| 4,212,030 | 7/1980 | Tooyama | 358/67 |
| 4,251,832 | 2/1981 | Isono | 358/67 |
| 4,259,687 | 3/1981 | Shinkai | 358/69 |
| 4,261,010 | 4/1981 | Isono et al. | 358/67 |
| 4,268,856 | 5/1981 | Akazawa | 358/67 |
| 4,268,857 | 5/1981 | Isono et al. | 358/67 |
| 4,280,134 | 7/1981 | Tooyama et al. | 358/67 |
| 4,281,340 | 7/1981 | Mitamura et al. | 358/67 |
| 4,287,531 | 9/1981 | Mitamura et al. | 358/67 |
| 4,305,022 | 12/1981 | Mitamura et al. | 358/67 |
| 4,333,105 | 6/1982 | Kaku et al. | 358/67 |
| 4,468,690 | 8/1984 | Midland | 358/67 |

Primary Examiner—Gerald Brigance
Assistant Examiner—David M. Miller
Attorney, Agent, or Firm—Pollock, VandeSande & Priddy

[57] ABSTRACT

A drive method for a color CRT in which a point-sequential color video signal is produced to drive a modulation electrode of the CRT, in which an index signal is generated consisting of pulses at a frequency identical to a frequency of scanning successive screen phosphor color trios of the CRT, multi-phase index signals are derived from that index signal, and respective time differences between scanning timings of each color trio in each scan line and a specific index signal phase are successively measured, stored in memory, and subsequently read out to produce timing control signals for gating the color components of the point-sequential video signal. Requirements for timing accuracy and assembly precision of the CRT can thereby be substantially relaxed by comparison with a prior art single-phase index signal method.

12 Claims, 13 Drawing Sheets

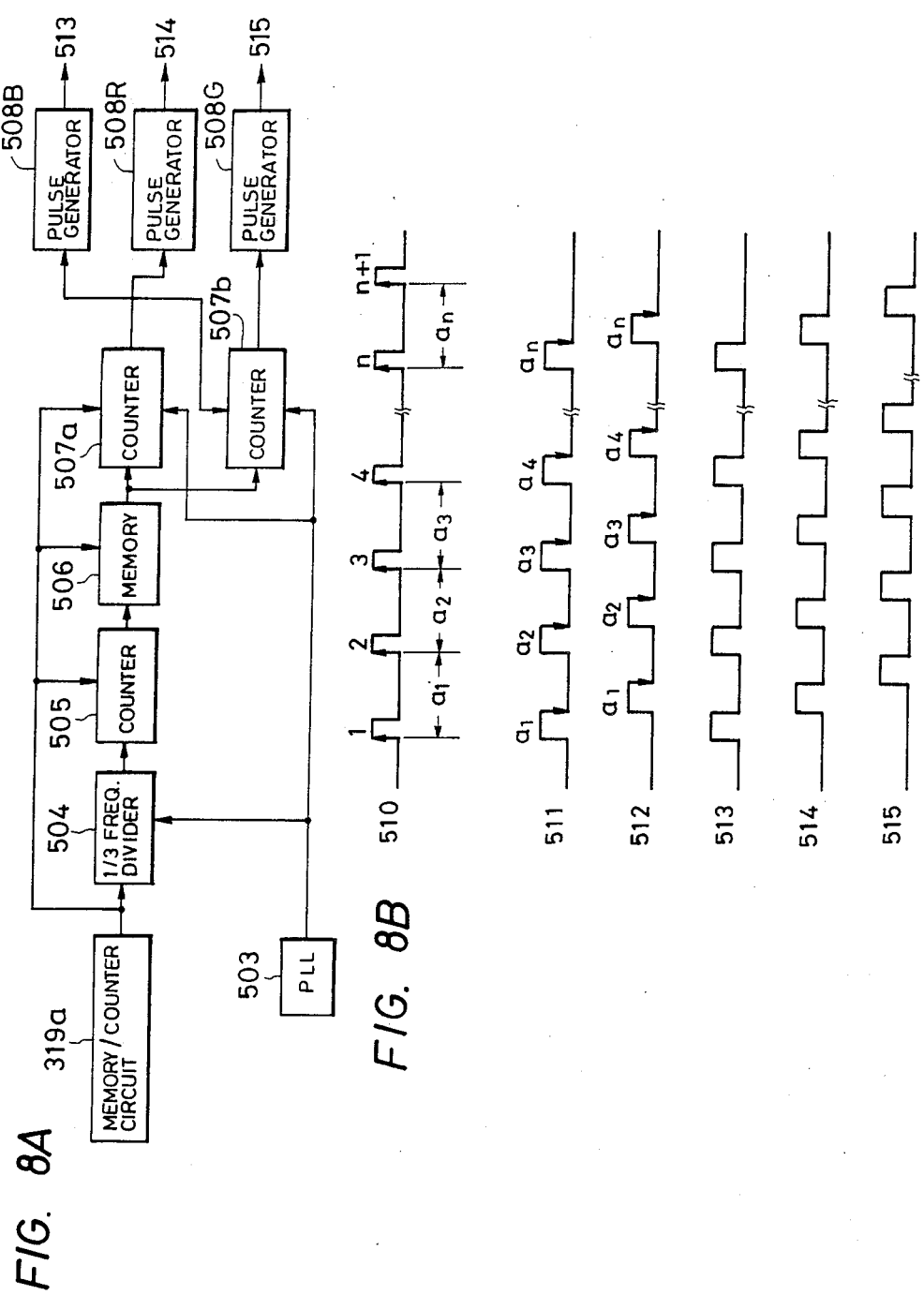

DRIVE METHOD FOR SYNCHRONIZING SCANNING AND MODULATION OF FLAT-CONFIGURATION COLOR CRT

BACKGROUND OF THE INVENTION

The present invention relates to an improved method of driving a cathode ray tube (hereinafter abbreviated to CRT) for color display, and in particular to a drive method for synchronizing timings of a point-sequential RGB color signal, applied as a modulation signal to a modulation electrode of a color CRT, with scanning of the CRT.

The method of the invention is directed in particular to a flat configuration color CRT which has been described in the prior art by the assignee of the present invention, having an array of line cathodes for generating a plurality of electron beams utilized to produce respective portions of each scan line of a display image. FIG. 1 is an oblique view illustrating an arrangement of internal components of an embodiment of such a CRT, in which numeral 101 denotes an array of line cathodes each of which extends vertically, the cathodes being disposed at regular spacings along the horizontal direction. Numeral 102 denotes a set of vertical scanning electrodes which are positioned immediately behind the line cathodes 101, with each vertical scanning electrode extending horizontally and with the vertical scanning electrodes being arrayed along the vertical direction with a fixed pitch. The total number of these vertical scanning electrodes is ½ of the total number of scan lines per frame of the displayed picture. The function of the vertical scanning electrodes is to enable or inhibit the emission of electrons from the adjacent portions of the line cathodes 101, by applying suitable selection voltages to these scanning electrodes (i.e. voltages with respect to the line cathodes 101). In operation, one vertical scanning electrode at a time is selected by an emission-enabling potential applied thereto (during a corresponding horizontal scanning interval), and modulated electron beams are generated from the corresponding portions of the line cathodes 101 as described in the following, while an emission-inhibiting potential is applied to each of the other vertical scanning electrodes. Thus during each field, the vertical scanning electrodes are successively selected in this way to implement vertical scanning by the electron beams. Control electrodes which are designated as a G1 electrode 103, a G2 electrode 104, and a G3 electrode 105 are successively disposed at specific spacings on the opposite side of the line cathodes 101 from the vertical scanning electrodes 102, for controlling the electron beams produced from the line cathodes 101 by predetermined potentials applied to these control electrodes. Apertures are formed in these electrodes 103 to 105 of respectively predetermined sizes, at positions respectively corresponding to the vertical scanning electrodes 102, through which the electron beams are passed. Vertical focussing and vertical deflection of the electron beams are then performed by electrodes 106 and 107 and a shield electrode 108. Apertures are of course also formed in these vertical focussing and deflection electrodes 106 and 107 for passing the electron beams, and the central axes of these apertures are vertically displaced relative to the central axes of the apertures formed in the G1 to G3 electrodes 103 to 105. Thus, the electron beams can be deflected vertically by variation of a voltage which is applied between the electrodes 106 and 107. This vertical deflection is used to displace the scan lines of one field of each frame with respect to the other field of the frame, to execute interlace scanning.

Horizontal focussing of the electron beams is performed by first, second and third sets of electrodes 109, 110 and 111, which are successively arrayed following the shield electrode 108 such that each electron beam must pass between an opposing pair of electrodes 109, an opposing pair of electrodes 110, and an opposing pair of electrodes 111. Suitable voltages are applied to these electrodes such that an electrostatic lens is formed between each such opposed pair of electrodes 109 and electrodes 110, and each opposed pair of electrodes 110 and 111, for thereby focussing each electron beam in the horizontal direction. To execute horizontal deflection of the beams, for horizontal scanning, a sawtooth waveform voltage is applied between each of the opposed pairs described above of the electrodes 109, 110 and 111. As a result of this application of a horizontal deflection potential to each electron beam as it passes successively between three pairs of opposed ones of the electrodes 109, 110 and 111, a high degree of deflection sensitivity is attained.

Numeral 112 denotes the anode face of the CRT, having formed thereon vertical stripes of fluorescent material (generally referred to as "phosphor" stripes, and so designated in the following) 113, which are arrayed with constant pitch along the horizontal direction, in a pattern consisting of successive red-emission, green-emission, blue-emission, ... stripes. These will be referred to in the following simply as R stripes, G stripes, and B stripes. As shown, the stripe pattern consists of repetitions of R, G, B, R, G, B, ... Such a set of successive R, G and B stripes will be referred to as a color trio. Each of these color stripes is separated from the adjacent color stripes by a black stripe 114. A metal back electrode 115 is formed over these phosphor stripes 113.

The operation of this flat configuration color CRT is as follows. Respective electron beams are derived from electrons emitted by the line cathodes 101, with modulation of each of the electron beams (i.e. by respective modulation voltages applied between each of the line cathodes 101 and the G1 electrode 101) being carried out in a similar manner to a conventional CRT. Vertical scanning is performed by applying an emission-enabling selection voltage to successive ones of the vertical scanning electrodes 102, as described above, during each of successive horizontal scanning intervals (referred to in the following as 1 H intervals). Thus, all of the vertical scanning electrodes 102 are successively selected during one vertical scanning interval (referred to in the following as a 1 V interval). During one 1 V interval, the voltage applied between the electrodes 106 and 107 is held constant. Before the next 1 V interval, this voltage is altered, such as to produce a predetermined amount of vertical deflection of the electron beams, as required for field interlace scanning.

During each 1 H interval, a single horizontal scan is performed by each of the electron beams obtained from the line cathodes 101 respectively, across respective portions of a complete horizontal scanning line. Respective point-sequential video signals (each consisting of a sequence of R, G, B, R, G, B, ... data values) are applied to the line cathodes 101 for modulating the respective electron beams.

It will be apparent that with such a CRT, the timings at which each electron beam falls upon each of the R, G, B phosphor stripes must precisely correspond to the timings at which corresponding R, G and B video data values are applied to the cathode of that electron beam. Any significant deviations between these timing values will result in incorrect color information being produced on the display, e.g. with R phosphor stripes being erroneously driven by G video data, and so on. In this respect such a flat configuration color CRT basically differs from a conventional color CRT which utilizes a shadow mask that is aligned with the phospor stripe or dot array. It can thus be understood that with such a flat configuration color CRT, it is essential to accurately synchronize the horizontal scanning of the electron beams with the point sequential color video signals which are applied to modulate the electron beams.

A prior art drive system for applying video signal drive to such a flat configuration color CRT will be described referring to the general system diagram of FIG. 2(a), and the corresponding waveform diagram of FIG. 2(b). Here, a flat-configuration color CRT 201 is basically divided into an index signal generating section 203 which is utilized in generating an index signal as described hereinafter, and an image display section 202 which produces a display image. The image display section 202 has the configuration described hereinabove referring to FIG. 1, but in this example has 6 line cathodes for generating respectively electron beams, so that the image display section 202 consists of six blocks (referred to the following as scanning blocks) 202a to 202f, each of which functions to produce a specific part (i.e. 1/6th) of each horizontal scan line of the displayed image, and each of which contains a fixed number of color trios. The rate at which these trios are successively scanned during a horizontal scanning interval will be referred to in the following as the trio frequency, which is identical to the frequency of a B timing signal that is described hereinafter. For simplicity of description, only the part of the drive system relating to scanning block 202b (indicated by cross-hatching in FIG. 2(a)) is shown. The index signal generating section 203 has an electrode structure which is identical to that of one scanning block of the image display section 202, i.e. having a single line cathode and corresponding electrodes. The index signal generating section 203 has an array of vertical phosphor stripes alternating with black stripes, with the pitch of these phosphor stripes being preferably equal to the pitch of the color trios of the image display section 202, although it is possible to make the pitch of the phosphor stripes of the index signal generating section 203 equal to ⅔ that of the color trios. It is possible to use the same material for the phosphor stripes of the image display section 202 as that used for the B phosphor stripes of the image display section. However it is preferable to use a short-wavelength emitting material such as P-47 fluorescent material for the phosphor stripes of the index signal generating section, to attain a high signal/noise ratio of the index signal.

During operation of the CRT, the index signal generating section 203 is scanned by electrode beams produced from the corresponding line cathode, in the same way as each scanning block of the image display section 202, with the start of each horizontal scan of the index signal generating section 203 being synchronized (i.e. by a horizontal sync pulse) with each horizontal scan of the image display section 202. The beam current of the index signal generating section 203 is held fixed, and and the light thus emitted from the phosphor stripes of the index signal generating section 203 is received by a photo-electric conversion element 204 to thereby produce an index signal 220, which is utilized as a timing reference signal as described hereinafter. Since the pitch of the phosphor stripes of section 103 is identical to that of the color trios of the image display section 202, the index signal will consist, during each horizontal scanning interval, of a train of pulses having a frequency which is identical to the trio frequency with which successive color trios are scanned.

With a flat configuration color CRT described hereinabove, horizontal scanning will of course not be precisely linear, so that the timings at which the electron beams of the scanning blocks successively fall upon the phosphor stripes will not be of fixed period, i.e. the trio frequency is not constant. The objective of the prior art drive system of FIG. 2 is (for each of the scanning blocks) to use the index signal generating section 203 to derive timing control signals for respectively gating the R, G and B video signals to the line cathodes of the image display section 202, with these timing control signals being synchronized with points in time at which respective phosphor stripes are actually scanned by the electron beams. This is achieved as follows. Firstly, a write mode of operation is entered, to obtain timing data for each of the scanning blocks, selecting these for data derivation one at a time. Normal horizontal and vertical scanning of the scanning block are performed, but with the electrode beams of the currently selected scanning block having a fixed beam current, and with the beam currents electron beams of the other scanning blocks being set below the "black level" value at which light emission begins. Light thus emitted from the B phosphor stripes of the selected scanning block is transferred through a blue filter 205, to be detected by a photo-electric sensor 211A. In practice, it is then necessary to transfer the output signal from the sensor 211A through a waveform shaping circuit 211B, containing a band pass filter and a limiter, in order to obtain a satisfactory waveform of a scanning timing signal 221 which is thus produced from the waveform shaping circuit 211B, as shown in FIG. 2(b). This scanning timing signal 221 is referred to in the following as a B timing signal, and consists of successive trains of pulses produced during respective horizontal scanning intervals, with the pulse timings during each 1 H interval respectively corresponding to timings at which a specific electrode beam falls upon the B phosphor stripes during that scanning interval. The time intervals $t_1$, $t_2$, ... shown in FIG. 2(b), each extending from a leading edge of a pulse of the index signal 220 until the next leading edge of a pulse of the B timing signal 221, are measured by a measurement circuit 206 and resultant time difference values stored in a memory circuit 207A. In this way, the timings at which the electrode beams fall upon the B phosphor stripes are stored in the memory as respective data values, for each of the electrode beams of one scanning block. The above process is then repeated for each of the other scanning blocks.

Subsequently during normal operation in which an image is to be displayed, based on R, G and B video signals (indicated as $E_R$, $E_G$ and $E_B$ in FIG. 2(a)) the data values that were stored in the memory 207A are read out in synchronism with successive pulses of the index signal 220. A pulse of a regenerated B timing signal 221 is thereby produced by a pulse generating circuit 207B following each pulse of the index signal 220, i.e. after a delay that is determined by the corresponding data value read out from the memory, so that the pulses of the regenerated B timing signal 221 occur after the time intervals $t_1, t_2, t_3, \ldots$ following respective index signal pulses. In this way, the B timing signal 221 is effectively regenerated based on the index signal 220, and hence (ideally) consists of pulses occurring at timings which correspond to respective timings at which the electron beams fall upon the B phosphor stripes of the image display section 202. This regenerated B timing signal is inputted to a 3-phase signal derivation circuit 207C, whereby gate timing signals 222, 223 and 224 are derived with reference to the regenerated B timing signal 221, such that signals 222, 223 and 224 mutually differ in phase by 120° and signal 222 coincides in phase with signal 221. Signals 222, 223 and 224 thus indicate the timings at which the electrode beams fall upon the B, G and R phosphor stripes, i.e. they are used to control the transfer of respective B, G and R modulated video signals through gates 208R, 208G and 208B respectively. Resultant output signals from the gates 208R to 208B are added in an adder 209, to produce a point-sequential color video signal that is amplified in an amplifier 210 and applied to the corresponding line cathode of the CRT. The same operation for producing a point-sequential color video signal is performed in parallel for each of the scanning blocks 202a to 202f, to thereby produce a displayed image.

However in order to accurately reproduce an image by a flat-configuration color CRT in the manner described above, it is necessary that any time difference between the index signal and the B timing signal be within a time interval corresponding to electron beam scanning across the pitch (designated in the following as P) of the R, G, B color stripe trios, i.e. the pitch of the B stripes. For this reason, the problem arises that the accuracy of positioning the horizontal focussing and deflection electrodes during assembling the CRT, and the component dimensional accuracy, must be extremely high.

A further problem which arises with such a prior art drive system is that a band pass filter is used in the process of deriving the B timing signal 221 during the memory write operation described above. Since as stated above there is some degree of horizontal scanning non-linearity, variation of the scanning frequency occurs, and hence variations in the input signal frequency applied to this band pass filter. Thus, phase shifts occur in the output signal from the filter, causing the data values that are stored in the memory to be inaccurate and hence preventing accurate generation of timing signals based upon the stored data values, for controlling transfer of video color signals to modulate the CRT.

Yet another problem which arises with the prior art drive system described above is that, to derive the 3-phase timing signals 222, 223 and 224 from the regenerated B timing signal, a band pass filter is used to derive the third harmonic component of that B timing signal, Since each train of B timing signal pulses of a scanning line is preceded by an interval in which no B timing signal pulses occur but a horizontal sync pulse is produced, the phase shift produced by that band pass filter at the start of each pulse train will deviate from that of the remainder of the pulse train. Thus, this is also a factor which prevents accurate timing signals from being produced for controlling application of the color video signals to modulate the CRT.

SUMMARY OF THE INVENTION

It is an object of the present invention to overcome the problems described above, by providing a drive method enabling accurate reproduction of a color image to be achieved by such a flat-configuration color CRT, together with a substantially increased tolerance for the degree of time deviation between the B timing signal and the index signal, so that requirements for assembly accuracy and component accuracy can be relaxed.

The above and other objects are achieved, according to a first aspect of the present invention, by utilizing multi-phase index signals for timing reference purposes during storage of measured time values for a B timing signal and subsequent read-out of these time values for controlling application of color video signals to modulate a CRT. In general, n-phase index signals can be utilized, i.e. n index signal pulse trains which mutually differ in phase by 2/n. Each of the measured time values is stored in a memory with reference to a specific phase of the index signals, with successively derived time values being stored (and subsequently read out) with reference to successive index signal phases. As a result, the permissible degree of timing deviation between the B timing signal and index signal can be substantially increased by comparison with the prior art. In a preferred embodiment, 2-phase index signal operation is employed, whereby the allowable timing deviation between B timing signal and index signal can be twice that for the case of the prior art drive system utilizing a single-phase index signal as described hereinabove.

According to another aspect of the present invention, values of timing error of a B timing signal resulting from phase deviations introduced during derivation of the B timing signal are measured and stored prior to normal operation of the CRT, and are applied during image display operation to correct the aforementioned measured time values such as to compensate for the timing errors.

According to another aspect of the present invention, three-phase gate timing signals for controlling transfer of video color signals to modulate a CRT are generated from a B timing signal without utilizing a band-pass filter for harmonic generations. This is achieved by deriving during each period between successive B timing pulses a first pulse whose width is precisely $\frac{1}{3}$ of that B timing signal period and which begins at the start of that period, and a second pulse whose width is identical to that of the first pulse and which begins at the end of the first pulse. Three successive fixed-width pulses are generated at the leading edge of the first pulse, at the falling edge of the first pulse, and the falling edge of the second pulse. In this way, three gating signal pulse trains for the R, G and B video signals are obtained, which mutually differ in phase by 120°, and are free from phase errors.

More specifically in a first aspect, the present invention provides a method of controlling, in synchronism with electron beam scanning of successive fluorescent element color trios of a color cathode ray tube, timings of primary color components of a point-sequential video signal for driving a modulation electrode of the cathode ray tube, the method comprising:

(a) deriving an index signal comprising, during each of successive horizontal scanning intervals of said electron beam scanning, a pulse train having a frequency identical to a trio frequency of said electron beam scanning;

(b) deriving a scanning timing signal comprising, during each of said horizontal scanning intervals, a train of pulses respectively generated at timings coinciding with timings of electron beam scanning of a predetermined fluorescent element in corresponding ones of said color trios;

(c) frequency dividing said index signal to obtain n-phase index signals comprising, during each of said horizontal scanning intervals, n pulse trains mutually differing in phase by 360/n degrees, where n is an integer of value greater than one;

(d) measuring time differences between each of $(1+m\cdot n)$th pulses of said scanning timing signal and a pulse of a first one of said n-phase index signals, time differences between each of $(2+m\cdot n)$th pulses of said scanning timing signal and a pulse of a second one of said n-phase index signals, . . . and between each of $(n+m\cdot n)$th pulses of said scanning timing signal and a pulse of an $n^{th}$ one of said n-phase index signals, where m takes the values 0, 1, 2, . . . ;

(e) storing said time differences as respective data values in memory means; and, (f) subsequently reading out said time difference values sequentially from said memory means and producing successive pulses at respective timings relative to said n-phase index signals that are determined by said time difference values, to thereby regenerate said scanning timing signal, and applying said scanning timing signal to control said primary color component timings of said video signal.

In a second aspect, the present invention provides a method of controlling, in synchronism with electron beam scanning of successive fluorescent element color trios of a color cathode ray tube, timings of primary color components of a point-sequential video signal for driving a modulation electrode of the cathode ray tube, the method comprising:

deriving an index signal comprising, during each of successive horizontal scanning intervals of said electron beam scanning, at least a single-phase pulse train having a frequency identical to a trio frequency of said electron beam scanning;

deriving a scanning timing signal comprising, during each of said horizontal scanning intervals, a train of pulses respectively generated at timings coinciding with timings of electron beam scanning of a predetermined fluorescent element in corresponding ones of said color trios;

measuring time differences between each pulse of said scanning timing signal and a pulse of said index signal, and storing said time differences as respective data values in memory means;

subsequently reading out said time difference values sequentially from said memory means and producing successive pulses at respective timings relative to said index signal that are determined by said time difference values, to thereby regenerate said scanning timing signal;

deriving from said regenerated scanning timing signal a set of 3-phase timing control signals comprising three pulse trains mutually differing in phase by 120°, each of identical frequency to said regenerated scanning timing signal and with one of said pulse trains coinciding in phase with said regenerated scanning timing signal, for respectively controlling timings of red, blue and green primary color components of said point-sequential video signal, said 3-phase timing control signals being derived by;

during each period between successive pulses of said regenerated scanning timing signal in a horizontal scanning interval, deriving a first pulse whose width 20 is ⅓ of said period and which begins at the start of said period, and a second pulse whose width is identical to that of said first pulse and which begins at the end of said first pulse;

successively generating a first timing control signal pulse on a leading edge of said first pulse, a second timing control signal pulse on a trailing edge of said first pulse, and a third timing control signal pulse on a trailing edge of said second pulse.

In another aspect, the present invention provides a method of controlling, in synchronism with electron beam scanning of successive fluorescent element color trios of a color cathode ray tube, timings of primary color components of a point-sequential video signal for driving a modulation electrode of the cathode ray tube, the method comprising:

deriving an index signal comprising, during each of successive horizontal scanning intervals of said electron beam scanning, at least a single-phase pulse train having a frequency identical to a trio frequency of said electron beam scanning;

deriving a scanning timing signal comprising, during each of said horizontal scanning intervals, a train of pulses respectively generated at timings coinciding with timings of electron beam scanning of a predetermined fluorescent element in corresponding ones of said color trios;

for each of said scanning timing signal pulses, measuring respective values of delay deviation which are applied to said pulses in a process of deriving said scanning timing signal, and storing in correction data memory means respectively corresponding correction values for compensation of said delay deviation values;

measuring time differences between each pulse of said scanning timing signal and a pulse of said index signal, and storing said time differences as respective data values in memory means;

subsequently reading out said time difference values sequentially from said memory means while concurrently reading out corresponding ones of said correction values from said compensation data memory means, adding said correction values to respective ones of said time difference values to obtain corrected time difference values, and producing successive pulses at respective timings relative to said index signal that are determined by said corrected time difference values, to thereby regenerate said scanning timing signal; and applying said regenerated scanning timing signal to control said primary color component timings of said video signal.

BRIEF DESCRIPTION OF THE DRAWINGS

FIG. 8A is a circuit block diagram for assistance in describing a method of deriving 3-phase gate timing signals from a B timing signal, according to the present invention;

FIG. 8B is a waveform diagram corresponding to FIG. 8A;

DESCRIPTION OF PREFERRED EMBODIMENTS

Figure 1:
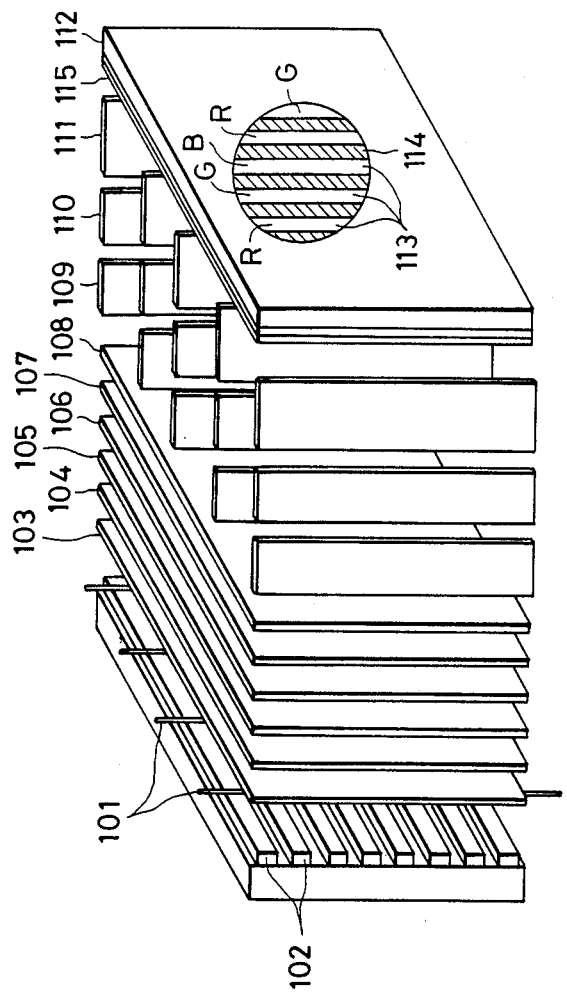
FIG. 1 is an oblique view to illustrate the internal structure of a prior art flat configuration color CRT.
Figure 2B:
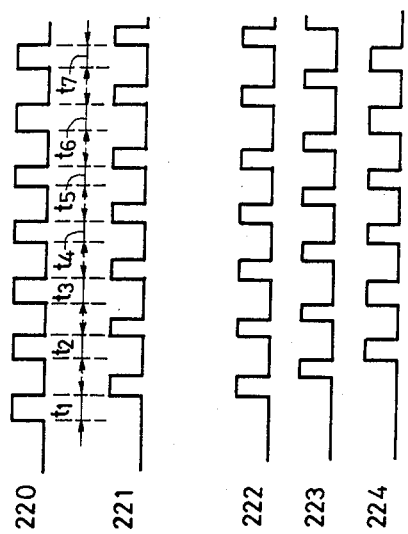
FIG. 2B is a waveform diagram corresponding to FIG. 2A.
Figure 2A:
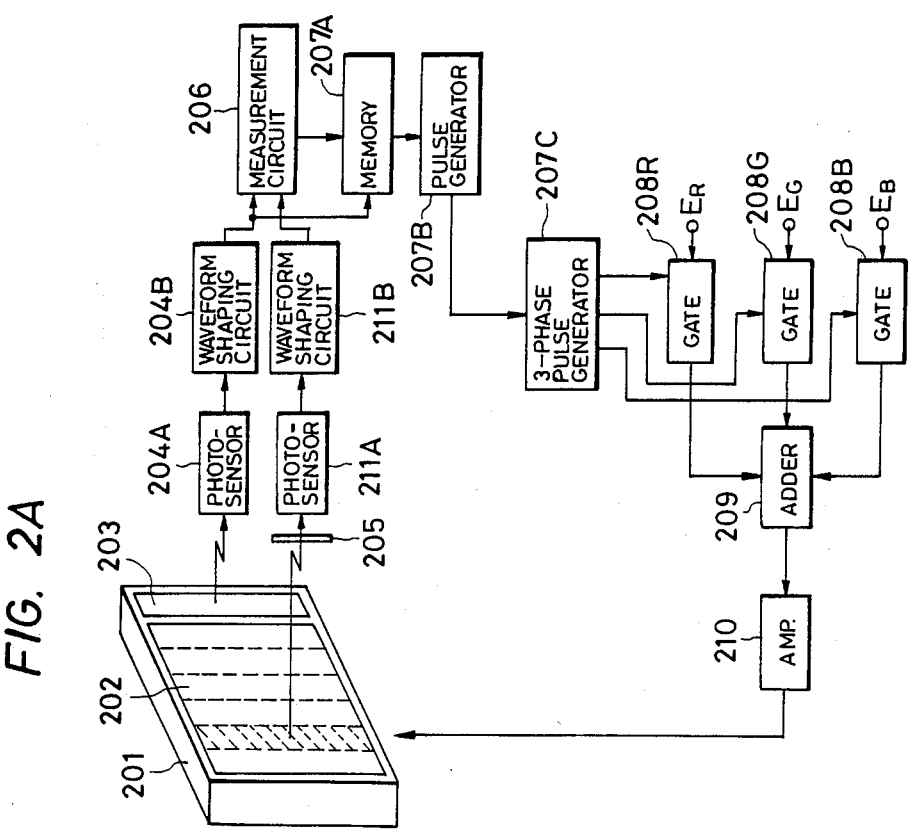
FIG. 2A is a partial general system diagram for describing a prior art drive system for applying color video signals to modulate a flat configuration color CRT.
Figure 3A:
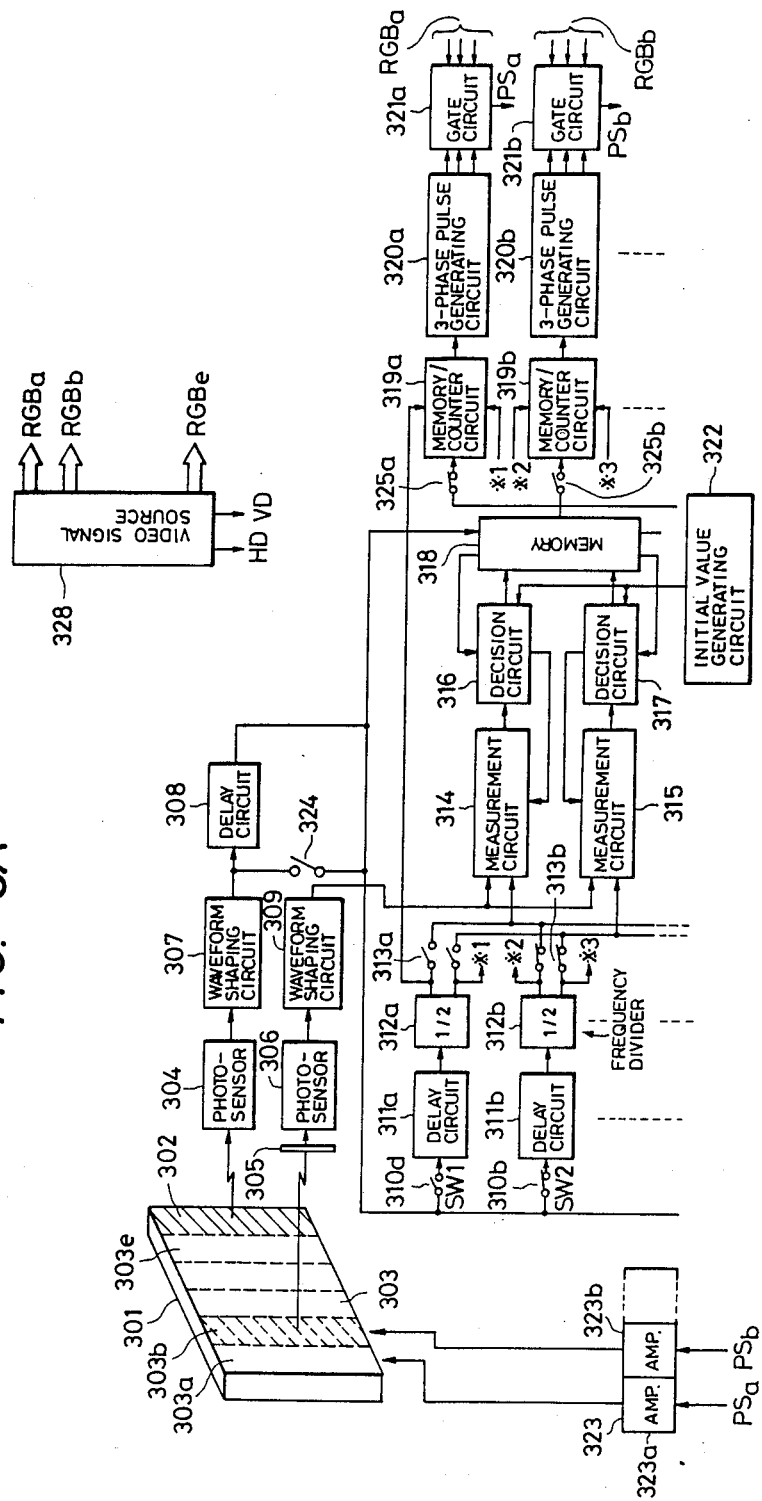
FIG. 3A is a partial general system diagram for describing an embodiment of a drive system according to the present invention for applying color video signals to modulate a flat configuration color CRT.

FIG. 3A is a partial general system diagram of an embodiment of a drive system according to the present invention for applying video color signals to modulate a flat configuration color CRT. A flat configuration color CRT 301 has an image display section 303 consisting of five scanning blocks 303aa to 303e, each having a structure as described hereinabove with reference to FIGS. 1 and 2, so that each scanning block functions to produce 1/5 of each scanning line of the CRT display. As in the example of FIG. 2, an index signal generating section 302 is positioned beside the image display section 303, and is provided with an array of vertical phosphor stripes alternating with black stripes, with the pitch of these phosphor stripes being identical to the pitch of color trios of the image display section 303, with scanning of the index signal generating section 302 being executed in synchronism with scanning of each of the scanning blocks as described hereinabove. Light emitted from the index signal generating section 302 is received by a photo-sensor 304 and converted to an electrical signal, which is shaped by a waveform shaping circuit 307, and the result is supplied as an index signal to a delay circuit 308 so long as a switch 324 is in the open state, and is transferred directly to a set of switches 310a, 310b, . . . 310e while the switch 324 is in the closed state. Similarly, blue light emitted from the B phosphor stripes of the CRT during memory write-in operation (described hereinafter) is passed through a blue filter 305 to be detected by a photosensor 306, with the resultant detection signal being shaped to form scanning timing signal, i.e. a B timing signal, by a waveform shaping circuit 309.

As for the prior art example described above, write-in of timing values for the B timing signal is executed prior to normal image display operation. During this write-in operation, the switch 324 is held closed. 310a, 310b, . . . 310e denote a set of switches which respectively correspond to the scanning blocks 303a to 303e, for selectively transferring the index signal from the waveform shaping circuit 307 through respective ones of a corresponding set of adjustable delay circuits 311a, 311b, . . . 311e to respective ones of a corresponding set of ½ frequency dividers 312a, 312b, . . . 312e each of which produces 2-phase index signals, i.e. a pair of pulse train signals mutually differing in phase by 180° and of ½ the frequency of the index signal from the the waveform shaping circuit 307, when the corresponding one of the switches 310a, 310b, . . . 310e is closed. The 2-phase index signals thus produced from each ½ frequency divider are applied to respective inputs of a corresponding one of a set of memory/counter circuits 319a, 319b, . . . 319e, i.e. each of which corresponds to a specific one of the scanning blocks 303a to 303e, and each of which performs a similar function to the combination of memory circuit 207A and pulse generating circuit 207B described hereinabove for the prior art example of FIG. 2. During normal display operation, regenerated B timing signals are produced from these memory/counter circuits 319a, 319b, . . . 319e to be supplied to corresponding ones of a set of 3-phase pulse generating circuits 320a, 320b, . . . 320e. Each of these B timing signals consists of successive pulses having the same phase relationship to the 2-phase index signals as that measured during data write-in operation. 3-phase timing control signal pulses are thereby produced, which are supplied to respective ones of a set of video signal control gate circuits 321a, 321b, . . . 321e, each of which consists of a set of three gate circuits and an adder circuit, respectively interconnected as shown for gate circuits 208R, 208G and 208B and adder 209B in the example of FIG. 2 described above, with the gate circuits being controlled by the respective 3-phase timing control pulses in the same manner as these gate circuits in FIG. 2. Respective RGB color video signals, designated as RGBa, RGBb, . . . RGBe are applied in parallel to corresponding ones of the video signal control gate circuits 320a, 320b, . . . 320e from a video signal source 328, which also produces horizontal and vertical sync signals HD and VD corresponding to these color video signals, for synchronizing horizontal and vertical scanning of all of the scanning blocks and the index signal generating section.

During timing data write-in operation, which is performed at the stage of manufacture of a display system containing the CRT, one of the switches 310a to 310e is manually set in the closed state (and the remaining ones of these switches in the open state) in order to select one of the scanning blocks 303a to 303e, while the corresponding one of the switch pairs 313a to 313b is also set in the closed state and the remainder left open. Timing data write-in is then executed for the selected scanning block (as described hereinafter), and upon completion of this the settings of the switches 310a to 310e and 312a to 312e are altered such as to select another one of the scanning blocks 303a to 303e. Timing data write-in is thereby executed successively for each of the scanning blocks.

314 and 315 denote measurement circuits which are coupled to receive respective ones of the two index signal pulse trains supplied from the one of the switch pairs 303a to 303e that has been set in the closed state, and also to receive in common the B timing signal produced from the the waveform shaping circuit 309. Timing values which are thereby measured, each representing a time difference between a B timing signal pulse and one of the 2-phase index signals) are supplied from the measurement circuits 314, 315 to respective decision circuits 316, 317, to be selectively transferred for storage in a temporary memory circuit 318. Output data from this memory circuit 318 can be selectively transferred to the memory/counter circuits 319a to 319e through switches 325a, 325b, ... 32e. Upon completion of timing data write-in for a selected scanning block, the corresponding one of these switches 325a, 325b, ... 352e is closed, and the timing data stored in memory 318 are transferred to the corresponding one of the memory/counter circuits 319a to 319e.

Figure 3B:
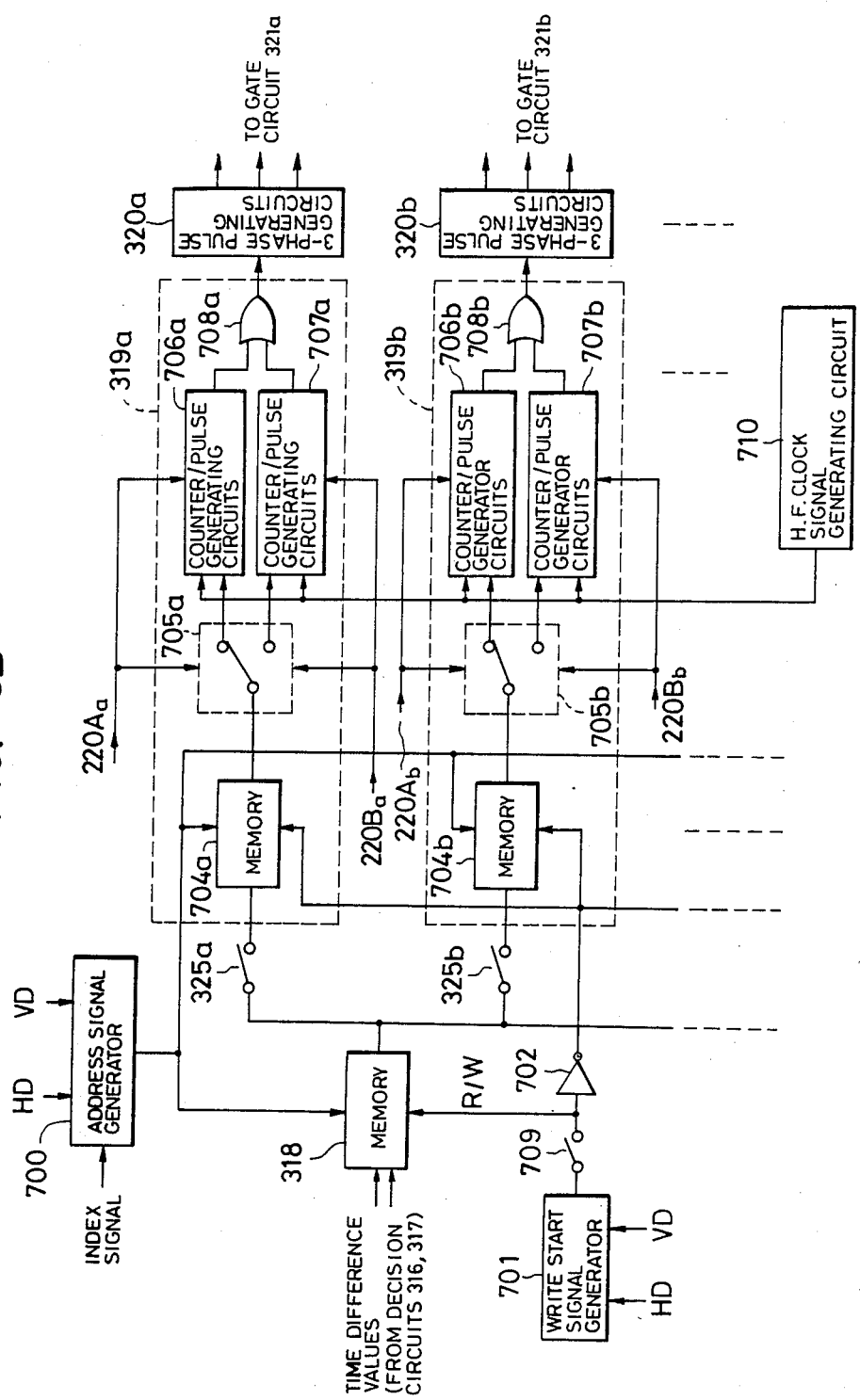
FIG. 3B is a partial circuit block diagram showing details of the system of FIG. 3A.

FIG. 3B is a partial block circuit diagram for illustrating in greater detail the configuration of the memory/counter circuits 319a, 319b, ... 319e. Each of these has the configuration shown for circuit 319a, which consists of a memory 720a, an adder 711a, two counter/pulse generating circuits 706a, 707a and an electronic switch 705a which is controlled by the 2-phase index signals 220A, 220B. Also shown is a write start signal generator 701 which generates signals to set memory 318 in the read mode of operation and each of memories 704a, 704b, ... 704e of the counter/pulse generating circuits 319a to 319e in the write mode. The 2-phase index signals corresponding to respective scanning blocks (i.e. which have been respectively delayed by delay circuits 311a, 311b, ... shown in FIG. 3A) are indicated as 220A$_a$, 220B$_a$, 220A$_b$, 220B$_b$, .... When a complete set of time difference data values for one scanning block have been stored in memory 318 as described above, the operator manually actuates a switch 709, to change memory circuit 318 from the write to the read mode, and to change each of memories 704a, 704b, ... 704e from the write to the read mode. The operator then manually closes the one of the the switches 325a, 325b, ... 325e that corresponds to the block concerned, until the stored data have been transferred from memory 318 to be written into the appropriate one of memories 704a, 704b, ... 704e, then closes that switch and opens switch 709. Storage of a new set of time difference values for the next scanning block into memory circuit 318 can then be initiated.

Figure 3C:
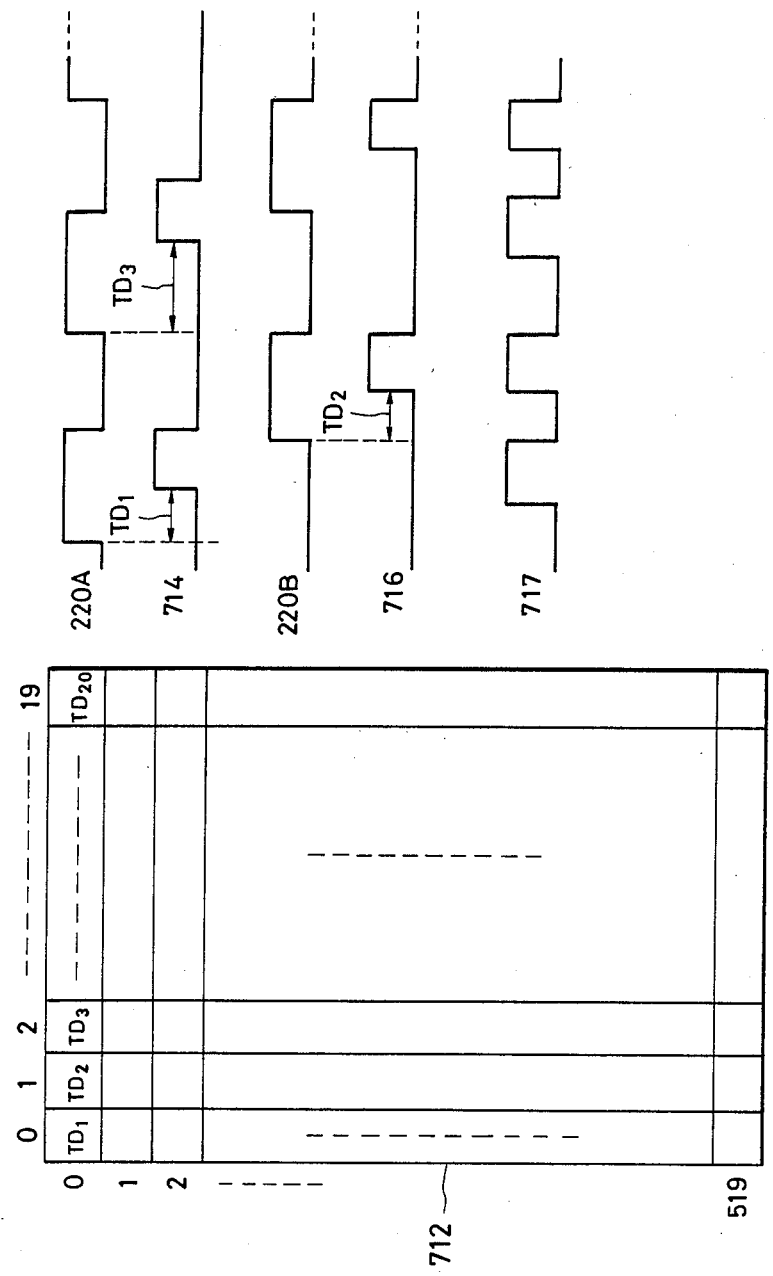
FIG. 3C is a memory map and a waveform diagram for assistance in describing the operation of memory and counter/pulse generating circuits shown in FIG. 3B.

When time difference values are written into one of the memories 704a, 704b, ... 704e, they are sequentially written into addresses which are successively specified by address signals from an address signal generator 700, synchronized by the index signal that is transferred from switch 324 shown in FIG. 3A, and the HD and VD signals. The same address signals are utilized during subsequent data read-out operation, i.e. during normal display operation. The storage arrangement for each of the memories 704a, 704b, ... 704e (and also for memory 318) is illustrated by the memory map 712 shown in FIG. 3C. Here, the time difference values $TD_1$, $TD_2$, . . . for the first scan line of the scanning block are successively written into addresses (0,0), (1,0), (2,0), ... respectively, then the values for the second scan line are written into addresses (1,0), (1,1), ... Subsequentaly, during read-out from each of memories 704a, 704b, ... 704e in normal display operation, these data values are read out in the same sequence as they were stored. Thus for example in the case of memory and signal regeneration circuit 319a, when value $TD_1$ is read out, switch 705a is controlled by index signal 220A$_a$ to transfer that data value to counter/pulse generating circuit 706a. The counter/pulse generating circuit 706a then begins counting clock pulses supplied from a clock pulse generating circuit 710, whose frequency is identical to that of clock pulses supplied to the measurement circuits 314, 315 shown in FIG. 3A. When a number of pulses equal to the value specified by $TD_1$ has been counted, the counter/pulse generating circuit 706a produces a fixed-width pulse (shown as waveform 714 in FIG. 3C), which is transferred through OR gate 708a as one of a regenerated B timing signal pulse train 717. When the next data value $TD_2$ is read out of memory circuit 712, switch 705a is controlled by index signal phase 220B to transfer that data value to counter/pulse generating circuit 707a. After a time determined by $TD_2$ has elapsed, a pulse is produced from the counter/pulse generating circuit 707a (shown as waveform 716), to be transferred through OR gate 708a as the second pulse of the regenerated B timing signal. This process is successively repeated thereafter, so that it can be seen that each of the pulses of the output signal 717 from OR gate 708a has the same phase relationship to a specific one of the 2-phase index signals 220A, 220B as a corresponding B timing signal pulse that was previously generated at the time of write-in to memory 318.

Figure 4:
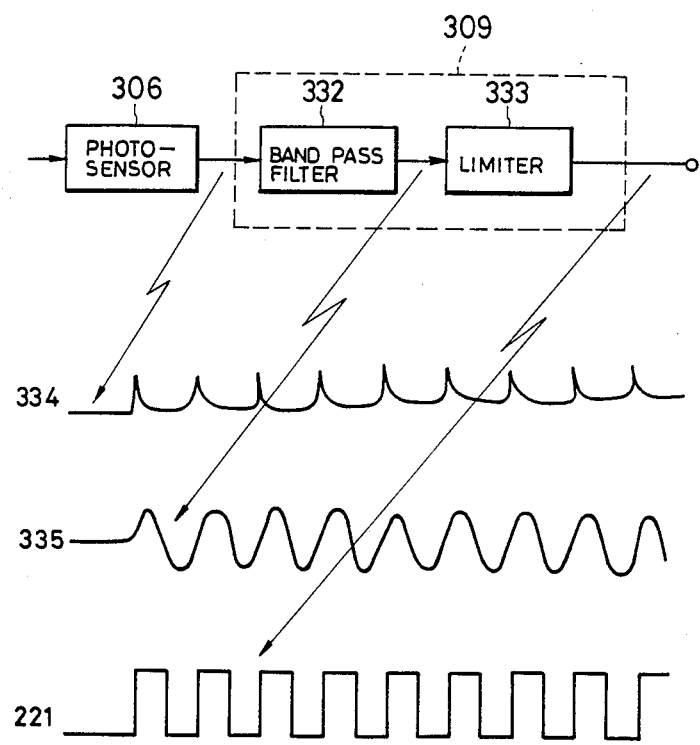
FIG. 4 is a general block diagram with associated waveforms for describing a method of deriving a B timing signal in the system of FIG. 3A.

The method of deriving the B timing signal is illustrated in FIG. 4. In data write-in operation, during each horizontal scan across the selected one of the scanning blocks, narrow low-amplitude pulses (indicated by waveform 334) are produced from the photo-sensor 306 as emission of blue light from successive B phosphor stripes of the selected scanning block is detected. In order to obtain a satisfactory signal waveform, this detection signal is transferred through a band pass filter 332 whose output (indicated by waveform 335) is passed through a limiter 333 to thereby obtain the B timing signal as a fixed-amplitude pulse train, i.e. filter 322 and limiter 333 form the waveform shaping circuit 309.

Figure 5:
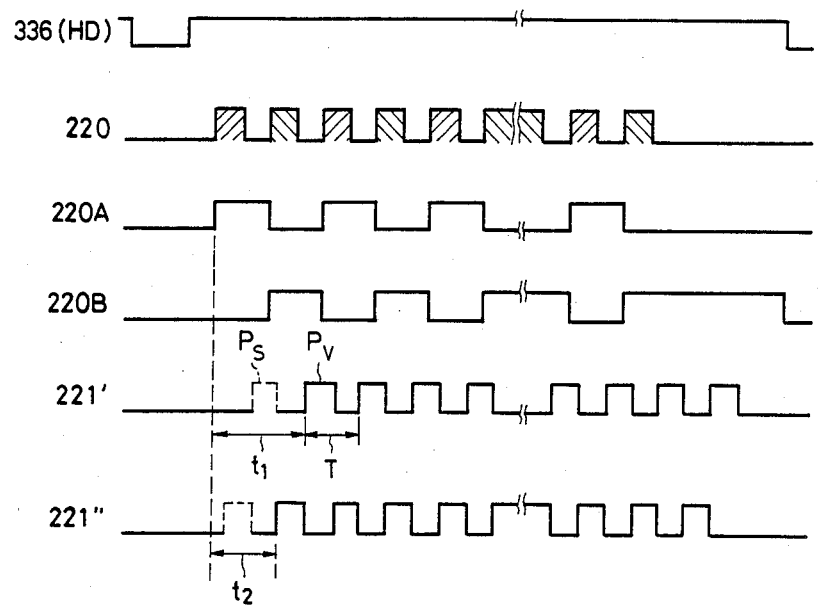
FIG. 5 is a waveform diagram for describing the operation of the drive system of FIG. 3A.

In the following description of the timing data write-in operation of this embodiment, it will be assumed that the second scanning block 303b has been selected, as indicated by the hatched-line portion of CRT 301. Thus, switch 310b and switch pair 313b are set in the closed state as shown, while initially all of the switches 325a, 325b, ... 325e are held open. The operation will be described referring to the waveform diagram of FIG. 5, and to FIG. 6A which shows relationships between the B timing signal and index signals during successive horizontal scanning intervals. Continuous scanning by the image display section 303 and index signal generating section 302 is executed during this write-in operation, with the electron beam current of the selected scanning block being fixed at a suitable level to produce emission from the phosphor stripes of that block, and the beam currents of the remaining blocks being held below the threshold "black level" value. In FIG. 5, waveform 336 is that of a horizontal sync signal HD which initiates each horizontal scanning interval, 220 denotes the index signal pulses produced during each horizontal scanning interval, as these appear at the output of variable delay circuit 311b, 220A and 220B denote the corresponding 2-phase index signal pulse trains produced from ½ frequency divider 102, which are transferred through switches 313b to respective inputs of measurement circuits 394 and 315. 221' denotes a train of B timing signal pulses produced during a first 1 H interval at the start of each field, i.e. at the start of each vertical scanning interval, and 221" shows the corresponding B timing signal pulses produced during the second 1 H interval of each field.

Each of the scanning blocks 303a to 303e has a specific number of phosphor stripe color trios assigned as a basic design parameter, so that a corresponding fixed number of B timing signal pulses should be produced during each 1 H interval, in timing value write-in operation However in an actual flat configuration color CRT, the horizontal scanning width of each block may extend beyond that set of color trios and overlap into those of an adjacent block, i.e. may fall upon a B phosphor stripe of an adjacent scanning block. This can result in a spurious B timing signal pulse being produced at the start (or end) of a valid B timing signal pulse train during a 1 H interval, as indicated by the pulse $P_s$ of waveform 221' shown in broken-line outline, preceding a first valid pulse of the B timing signal designated as $P_v$. It is necessary to exclude such spurious pulses during time value measurement and storage operations, as described hereinafter.

Figure 6A:
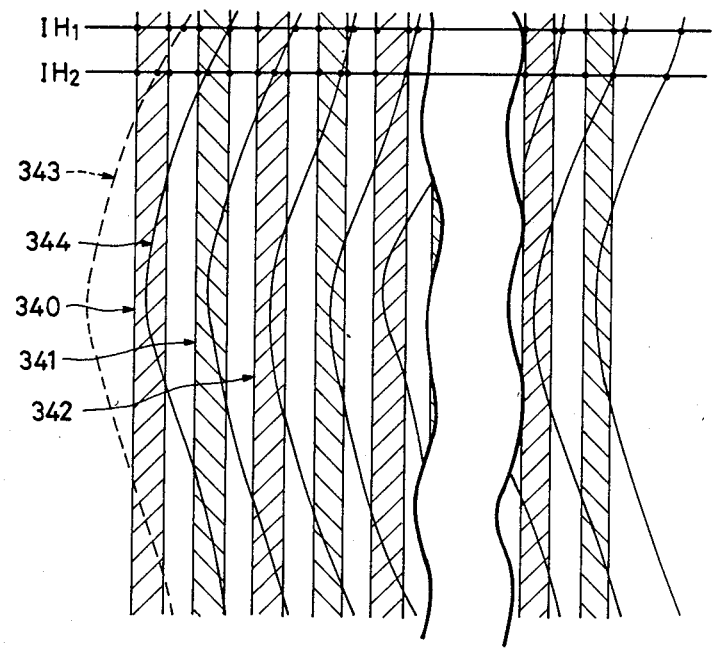
FIG. 6A is a diagram for illustrating timing relationships between an index signal and a B timing signal during successive horizontal scanning intervals of the CRT, corresponding to FIG. 5.

In FIG. 6A numeral 340 denotes the timings of pulses of the index signal 220 of FIG. 5, with corresponding directions of cross-hatching being employed to indicate correspondence between pulses of FIG. 5 (at the H logic level) and timings in FIG. 6A. Since the timings of the index signal are used throughout as reference timing values, they are indicated in FIG. 6A as following straight vertical paths during successive 1 H intervals of a field. The timings of the rising edge of the first pulse of index signal 220A during each 1 H interval is indicated by curve 340, the corresponding timing line for the rising edge of the first pulse of index signal 220B is indicated by curve 341, the corresponding timing line for the rising edge of the second pulse of index signal 220A is indicated by curve 342. The timings of the rising edge of the spurious pulse $P_s$ during successive 1 H intervals are indicated as following the broken-line curve 343, while the corresponding timing line for the rising edge of the first valid pulse $P_v$ of the B timing signal is denoted by numeral 344. As can be understood from FIG. 6A, the timings of the B timing signal pulses may vary substantially with respect to the index signal 220 during each field. However it can also be seen that there is a strong correlation between the timings of the B timing signal pulses produced during each 1 H interval (relative to the index signal 220) and the timings of corresponding B timing signal pulses produced during the succeeding 1 H interval. (For ease of understanding, the difference between these corresponding B timing signal timings during the first and second lhis in FIG. 6A have been considerably exaggerated).

Figure 6B:
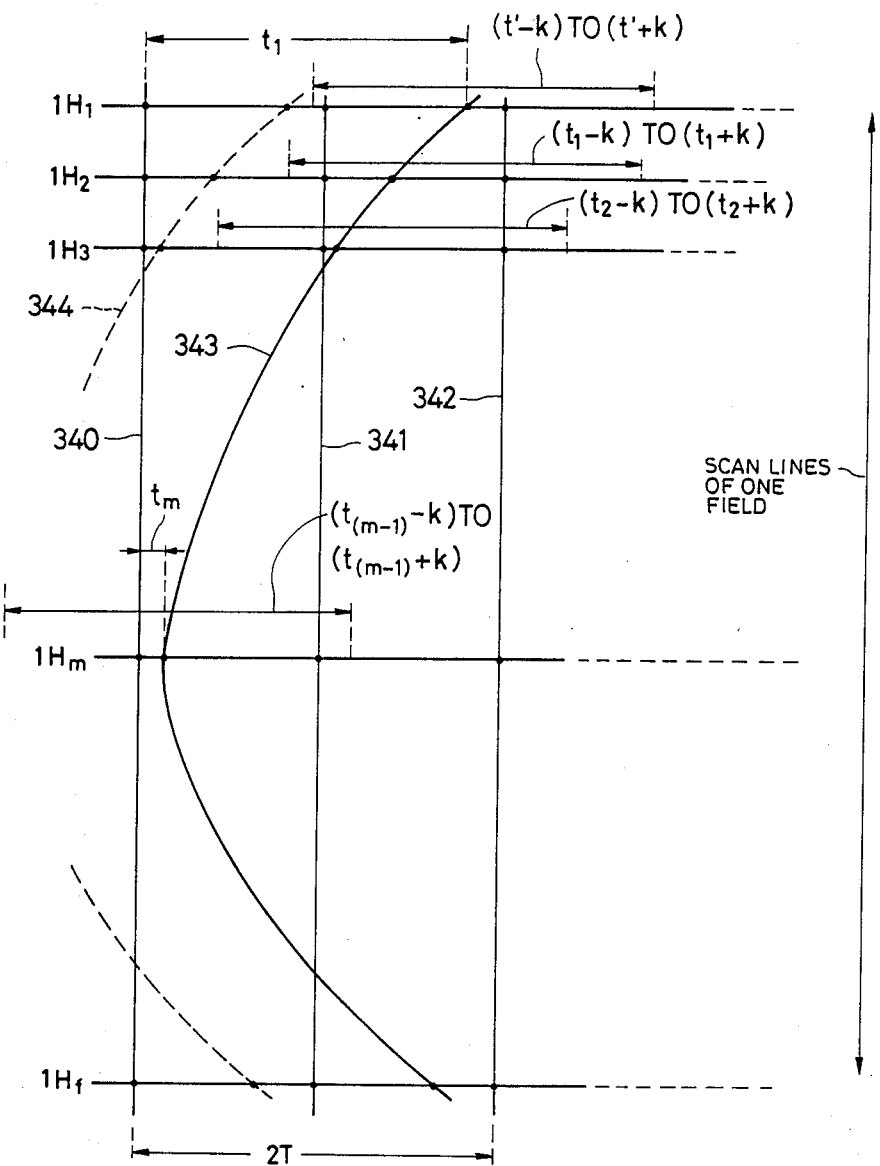
FIGS. 6B and 6C are diagrams illustrating timing relationships between an index signal and a B timing signal during successive horizontal scanning intervals, showing an initial part of each scan interval in detail.

The timing values which are to be measured are each determined, in this embodiment, as a time difference between each B timing signal pulse during each 1 H interval and an immediately preceding rising edge of either index signal 220A or 220B. FIG. 6B is a timing diagram similar to FIG. 6B, but with the horizontal scale expanded to clearly show the time difference $t_1$ between the first rising edge of index signal 220A and the rising edge of first valid B timing signal pulse $P_v$ during the first scan interval 1 $H_1$ of a field. In this example, the corresponding time difference for the $m^{th}$ scan interval $1H_m$ is $t_m$, which is considerably smaller than $t_1$. These time difference values $t_1$ etc. are measured by means of an oscilloscope. Thus in order to render such measurement possible, prior to the start of timing value measurement and storage for the selected block, the waveforms of at least signals 220a and 221' shown in FIG. 5 are visually examined using an oscilloscope. The time delay produced by the corresponding one of variable delay circuits 311a to 311e (in this case, 311b) is then adjusted such as to vary the phase of the index signal 220 until the first rising edge of B timing signal pulse train 221' occurs after the first rising edge of index signal 220A. Furthermore since the total amount of permissible variation of the time difference values $t_1$ etc. must be within 2T, where T is the the minimum value of the period of the B timing signal, the delay should be adjusted such that all of these time difference values will fall within the rising edges of the first and second pulses of index signal 220A (corresponding to lines 340 and 342). Thus for the example of FIG. 6B, the delay must be adjusted such that the $t_1$ is substantially greater than T (but less than 2T), so that the time difference value $t_m$ for the $m^{th}$ scan line will be measurable. It is therefore necessary to set the initial time difference $t_1$ in accordance with the overall trend of the time difference values for all of the scan lines of a field.

Figure 6C:
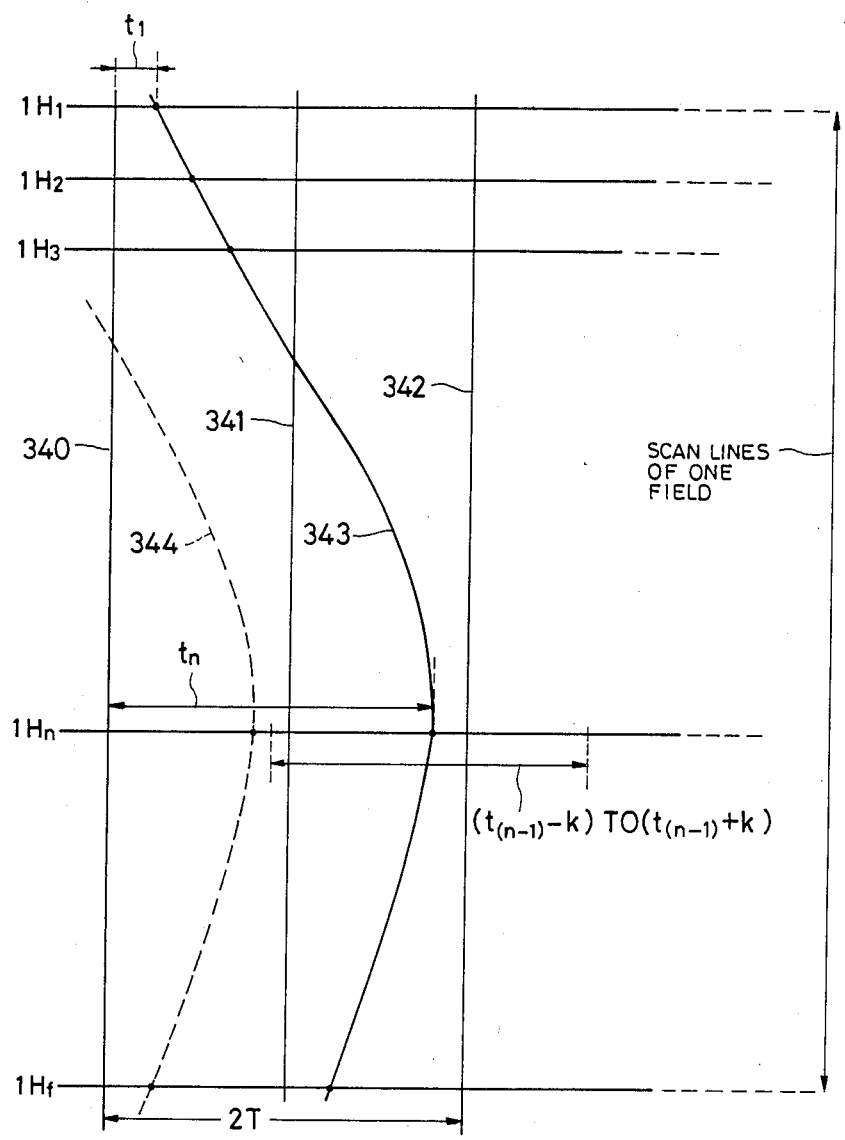

If the trend is in the opposite direction, as illustrated in the example of FIG. 6C, then it will be necessary to make the value of $t_1$ substantially smaller than T, as shown, in order to ensure that all of the time difference values (e.g. $t_n$ for the nth scan interval 1 $H_n$) will be measurable.

The approximate value of the first time difference $t_1$ is then measured, e.g. by visual observation, and a data value representing this time difference (referred to in the following as t') is then set into an initial data generating circuit 322. It is not necessary that the value of t' correspond precisely to the actual time difference $t_1$, but t' should not be smaller than $t_1$. This initial data value is then applied to inputs of each of measurement circuits 314 and 315.

The corresponding one of switch pairs 313a, 313b, . . . 313e, i.e. in this example 313b, is then closed. Sequential time value measurement and storage operations are then initiated (with time difference values being sequentially written into memory 318 in accordance with the memory map described hereinabove) as follows, for the first scan line of a field. Firstly, measurement circuit 314 measures the value of time difference $t_1$ for the first of the B timing signal pulses 221' of the first scan line. Each of the decision circuits 316 and 317 includes a register for holding a time difference value, and the measured time difference value $t_1$ is temporarily held in this register of the decision circuit 31. The decision circuit 316 then judges whether this value is less than or within the range (t'−k) to (t'+k). Here, k is a value which must be less than T (where T is the minimum value of the B timing signal period, i.e. the minimum value of the period of the trio frequency), but should be made as large as possible. If the measured value is found to be less than (t'−k) then that value is ignored, while if the value is within the range (t'−k) to (t'+k) then the value is written into the memory 318. Thus, since the timing of the spurious pulse $P_v$ is outside that range, as illustrated in FIG. 6B and in FIG. 6C, it will be ignored, while the initial time difference $t_1$ will be stored in memory 318. A similar process is then repeated by the measurement circuit 315 and decision circuit 317 for the first rising edge of index signal 220B and the the first valid pulse $P_y$ of B timing signal 221'. In this case the measured value of $t_1$ will be ignored. These operations are thereafter repeated for each of the pulses of B timing signal 221'. It can thus be seen that each of the timing values for the odd-numbered pulses of the the B timing signal 221' will be stored in memory 318 as a time difference with respect to a rising edge of index signal phase 220A, while each of the timing values for the even-numbered pulses of B timing signal 221' will be stored as a time difference with respect to a rising edge of the index signal phase 220A.

The above operations are preferably then repeated for a plurality of occurrences of this 1 H scanning interval, to thereby obtain integrated average values for the timing values which are left stored in memory 318, and so attain greater measurement accuracy than is possible if only a single 1 H interval is processed.

Upon completion of these timing value measurement/storage operations for the first 1 H interval, transfer of the initial data value t' from the initial data generating circuit 322 to the decision circuits 316, 317 is terminated, and the actually measured value of time difference $t_1$ obtained for the first scan line is read out from memory 318 and supplied to each of the decision circuits 316, 317. The timing value measurement/storage operations described above for the first 1 H interval are then repeated for the second 1 H interval, but in this case the measured value $t_1$ is used in place of the initial value t' for the judgements executed by the decision circuits 316, 317. These timing value measurement/storage operations are then repeated for the third 1 H interval, but using the value $t_2$ that was measured during the second 1 H interval. These operations are thereafter sequentially repeated for each of the remaining scanning lines of the field, with the value of t that is used for comparison purposes by the decision circuits 316, 317 being in each case obtained as a measured value in the immediately preceding 1 H interval.

The above process can be clearly understood from FIGS. 6B and 6C. It can also be understood from the above description that the maximum allowable range of phase variation of the B timing signal can be made almost as large as 2T. That is to say, the allowable range of variation is approximately twice that which can be realized with the prior art drive system of FIG. 2. This greatly facilitates the manufacture of such a flat CRT, since the requisite positioning tolerances and dimensional accuracies required for the various structural components of the CRT can be considerably relaxed, by comparison with the prior art. A practical flat configuration color CRT display system can thereby be achieved at substantially lower manufacturing cost than has been possible hitherto.

Timing values for all of the B timing signal pulses of the selected block, determined with respect to the 2-phase index signals 220A, 220B have now been stored in memory 318.

Write operation of memory 318 is then terminated, the appropriate one of switches 325a, 325b, ... 325e (in this example, 325b) is closed, and the timing values stored therein for the selected scanning block 303b are read out of memory 318 and written into the memory circuit of memory/counter circuit 319b as described hereinabove.

The above operations are successively performed for each of the scanning blocks 303a to 303e, leaving timing values for all of the B timing signal pulses of each scan line of each scanning block stored in the memory/counter circuits 319a to 319e.

It should be noted that the invention is not limited to the use of 2-phase index signals as described above. In general, n index signal phases, i.e. respective index signal pulse trains of identical frequency to the original index signal that is derived from the index signal generating section, mutually differing in phase by 360/n degrees, and with one of these being identical in phase to the original index signal. In that case, time differences would be measured between each of $(1+m\cdot n)^{th}$ pulses of the B timing signal and a pulse of a first one of said n-phase index signals, between each of $(2+m\cdot n)^{th}$ pulses of the scanning timing signal and a pulse of a second one of the n-phase index signals, ... and between each of $(n+m\cdot n)^{th}$ pulses of the scanning timing signal and a pulse of an $n^{th}$ one of the n-phase index signals, where m takes the values 0, 1, 2, .... It can be understood that the overall operation for the case of the number of phases n being greater than 2 will be similar to that described for 2-phase index signal operation.

Normal image display operation can now be executed. Before this is initiated, switch 324 is opened, and each of the switches 310a to 310e is set in the closed state (to transfer the index signal from the output of variable delay circuit 308 to each of the variahle delay circuits 311a to 33e and hence to the respectively ½ frequency dividers 312a to 312e. All of the switches 325a, 325b, ... 325e are left open. The index signal generating section 302 is scanned continuously with a fixed level of beam current, in the same way as during the operations described above. The timing values stored in each of the memory circuits of the memory/counter circuits 319a to 319e are sequentially read out in accordance with the respective 2-phase index signals derived from the corresponding one of the ½ frequency dividers 312a to 312e, with a fixed-width pulse being generated following each rising edge of each of the 2-phase index signals after a time delay that is determined by a timing value read out from that memory circuit in correspondence with that index signal, as described hereinabove with reference to FIGS. 3B and 3C.

Various delays are introduced during the processing operations described above, which respectively differ for time difference value write-in and read-out operations, so that the timings of the regenerated B timing signal thus produced may not precisely match the corresponding timings at which the electron beams scan across the B phosphor stripes. However this problem is overcome by adjusting the amount of delay introduced by the variahle delay circuit 308, after switch 324 has been opened, such as to compensate for this timing error.

Figure 7A:
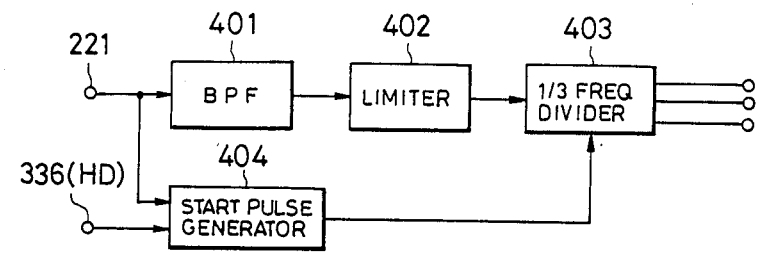
FIG. 7A is a block circuit diagram of a prior art system for deriving 3-phase gate timing signals from a B timing signal, for controlling transfer of a point-sequential color video signal to modulate a CRT.
Figure 7B:
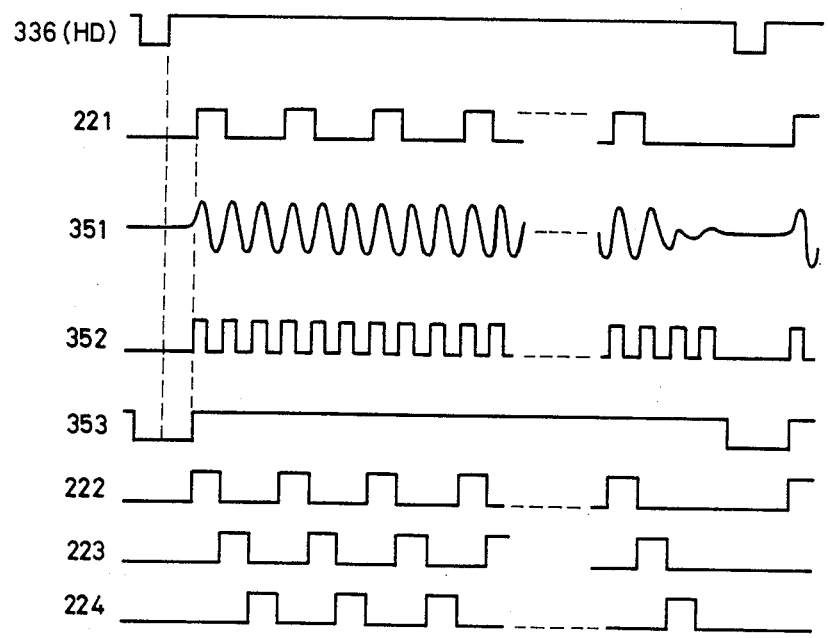
FIG. 7B is a waveform diagram corresponding to FIG. 7A.

A prior art method of deriving a set of three pulse trains mutually differing in phase by 120° for use as timing control signals (referred to in the following simply as 3-phase pulse trains) from the regenerated B timing signal pulses produced by each of the memory/counter circuits 325a, 325b, ... 325e is illustrated in FIG. 7A, whose signal waveforms are illustrated in FIG. 7B. Here, each of the 3-phase pulse generating circuits 320a, 320b, . . . 320e in FIG. 3A includes a band-pass filter (BPF) 401 having a center frequency $3f_t$ which is three times the fundamental frequency $f_t$ of the B timing signal 221 and is coupled to receive the regenerated B timing signal pulses 221. A signal 351 is thereby derived by the BPF 401 which is the third harmonic of signal 221. This signal 351 is then subjected to waveform shaping in a limiter 402, and the resultant signal 352 is frequency divided in a frequency divider 403 to thereby derive 3-phase signals 222, 223 and 224. Operation of the frequency divider 303 is controlled as shown in FIG. 7B by a start signal 353 which is produced from a start pulse signal generating circuit 404 in response to the first pulse of the B timing signal 221 at the start of each 1 H interval and the horizontal deflection signal 353 (HD). However this first pulse of the B timing signal 221 in each scan line is preceded by an interval containing no pulses, during which a pulse of the HD signal 336 is generated. This results in disturbance of the phase of the initial portion of the third harmonic signal 351 in each 1 H interval, so that accurate color phase control cannot be achieved for the initial part of each horizontal scan.

FIG. 8(a) is a block schematic diagram of an embodiment of a 3-phase pulse generating circuit according to the present invention, and FIG. 8(b) is a corresponding waveform diagram. The operation for the case of the first scanning block 303a will be described. The regenerated B timing signal pulses which read out from the memory/counter circuit 310a during one 1 H interval in normal display operation are shown as waveform 510, designating the number of color trios in each scanning block as n. As shown, the total number of pulses of signal 510 in each 1 H interval is made equal to (n+1), by making the scannning width of the electron beams of each scanning block overlap into the next scanning block to the right, so that a B phosphor stripe of that adjacent block is driven into emission. The signal 510 is then applied as a control signal to a ⅓ frequency divider 504. A high-frequency clock signal (e.g. at a frequency of 50 MHz) produced from a PLL (phase lock loop) circuit 503 is also inputted to the ⅓ frequency divider 504 to be frequency-divided by a factor of ⅓, with signal 510 functioning as a set/reset signal for the frequency dividing operation. The operation of PLL 503 is synchronized with the horizontal sync signal HD, and the frequency of the high-frequency clock signal produced thereby is an integral multiple of the horizontal scanning frequency. A zero-phase frequency divided signal, i.e. in which the rising edge of the first pulse in each 1 H interval coincides in phase with the rising edge of the first pulse of signal 510, is produced as output from frequency divider 504. Numeral 505 denotes a counter circuit which counts pulses of the frequency-divided output signal from frequency divider 504 during each period of signal 510, i.e. during each of the intervals $a_1$, $a_2$, $a_3$, . . . $a_{n-1}$ shown in FIG. 8B. The pulse count values for these intervals during the intervals $a_1$, $a_2$, $a_3$, . . . $a_{n-1}$ are successively stored at addresses of a memory 506. This counting and storing operation is repeated for all of the pulses of signal 510 during the first 1 H interval of a field.

During the second 1 H interval of that field, the count values that have been stored in memory 506 are sequentially read out, at timings synchronized with successive pulses of the signal 510 from memory/counter circuit 319a, and are supplied to two counter circuits 507a and 507b to determine count values which will be attained by these counter circuits. The high frequency clock signal from the PLL 503 is supplied to these counter circuits 507a, 507b, to be counted thereby. The B timing signal 510 is supplied to counter 507a to control counting operation, while the output signal produced from counter 507a is similarly applied to control the counter 507b. Each time a count value is read out from memory 506, e.g. at the timing of a rising edge of signal 510, counter 507a begins counting pulses of the high frequency clock signal beginning from that rising edge of signal 510 and terminating when the count value that has been read out is attained, with an output signal 511 going to the high logic level at the start of counting and returning to the low level at the en of counting. This is executed during each of the intervals $a_1$, $a_2$, $a_3$, . . . $a_{n-1}$ of signal 510 during the second 1 H interval of the field. As described previously hereinabove, there is a strong correlation between the B timing signal pulses produced one 1 H interval and those produced during the succeeding 1 H interval, so that it can be understood that the intervals $a_1$, $a_2$, $a_3$, . . . $a_{n-1}$ for the first 1 H interval will be substantially identical in phase to those during the second 1 H interval, relative to the start of each 1 H interval.

Thus, it can be seen that the output signal produced from counter 507a during the second 1 H interval will be as shown by waveform 511 in FIG. 8B, i.e. a first pulse synchronized with the start of first period $a_1$ and having a pulse width which is precisely ⅓ of the period $a_1$, a second pulse synchronized with the start of the second period $a_2$ and having a pulse width which is precisely ⅓ of the period $a_2$, and so on.

The operation of counter circuit 507b is similar to that of circuit 507a. Each time a count value is read out of memory 506, counting of the high frequency clock pulses from PLL 503 is initiated at the next falling edge of signal 511 from counter 507a, and is terminated when the count value is attained, with an output signal 512 from counter circuit 507b going to the high logic level when counting begins and returning to the low level when counting ends. Thus, the waveform of signal 512 will be as shown in FIG. 8B, with a first pulse synchronized with the end of the first pulse of signal 511 in the first period $a_1$ and having a pulse width which is precisely ⅓ of the period $a_1$, a second pulse synchronized with the end of the second pulse of signal 511, during the second period $a_2$ and having a pulse width which is precisely ⅓ of the period $a_2$, and so on.

The pulse generator circuit 508R responds to each falling edge of the pulses of signal 511 from counter circuit 507a by producing a fixed-width pulse. The pulse generator circuit 508B similarly responds to each rising edge of signal 511 from counter circuit 507a by producing a fixed-width pulse, while pulse generator circuit 508G responds to each falling edge of signal 512 from counter circuit 507b by producing a fixed-width pulse. The operations described above for the first and second 1 H intervals of a field are repeated for each of the 1 H intervals of each field, whereby the pulse trains 513, 514 and 515 mutually differing in phase by 120° are derived from pulse generator circuits 508B, 508R and 508G, as timing control signals for gating the B, R and G video signals respectively to sequentially transfer respective color components of a point-sequential video signal.

Each of the pulse generator circuits 508B, 508R and 508G can for example consist of a counter which begins to counts a fixed number of high-frequency clock pulses each time a rising edge (in the case of 508B) or a falling edge (in the case of 508R, 508G) of the corresponding one of signals 511 or 512 occurs, and produces a high-level output during counting.

The operation of this embodiment during each field can be summarized as follows. During each period of the B timing signal in a first 1 H interval of the field, frequency division of the clock signal from PLL 503 is executed by a factor ⅓, to produce frequency-divided clock pulses. The number of these pulses produced during each period is counted, and the count value is stored as a data value in memory 506. Count values for each of the B timing signal pulses of the first 1 H interval are thereby stored in memory 506. In the second 1 H interval of the field, the above process is repeated, to store a new set of count values for the B timing signal pulses of that second 1 H interval. In addition, the stored count values obtained in the first 1 H interval are successively read out at timings determined by timings of B timing signal pulses during the second 1 H interval, to thereby produce a set of first pulses each beginning at the start of a B timing signal period (i.e. the pulse train 511 in FIG. 8B), and a set of second pulses (512) each beginning at the end of one of the first pulses (511). During each B timing signal period of the second 1 H interval, three successive gate control pulses (513, 514, 515) are produced at successive edges of the first and second pulses of that period, as described hereinabove. During the third and subsequent 1 H intervals, operations corresponding to those for the second 1 H interval are executed, i.e. with count values stored during the preceding 1 H interval being successively read out, while new count values for the succeeding 1 H interval are stored in memory.

It can thus be understood that this embodiment of the present invention enables 3-phase pulse trains which mutually differ in phase by precisely 120° to be derived with a high degree of accuracy from the regenerated B timing signals produced from the memory/counter circuits 325a, 325b, ... 325e of FIG. 3A, and is free from the phase disturbances which occur with the prior art method described hereinabove.

It will of course be apparent that if the memory circuit 506 consisted of only a single memory, e.g. capable of storing data for one scan line, then it would be necessary to execute both write and read operations of that memory during each scan line after the first line of a field. That is, it would be necessary to sequentially read out a data value, write in a new data value to replace that which has just been read out (i.e. a new value for use in the next scan line), read out the next data value, and so on. Thus although memory 506 has been described as a single memory in the above, for simplicity of description, in a practical system it is necessary to implement the memory 506 as a pair of line memories, which are set in mutually alternating write and read modes in successive 1 H intervals.

This embodiment has been described in the above for the case of 3-phase pulse generation. However in general the embodiment is applicable to n-phase pulse generation, where n is an integer.

A circuit for deriving the B timing signal utilizing photo-sensor 306 during time difference measurement and storage operation has been described hereinabove referring to FIG. 4. With such a circuit, due to the group delay characteristic of the BPF 312, a phase shift of the B timing signal will occur between the input and output of this filter. If the horizontal scanning of the CRT is not absolutely linear, frequency variations of the B timing signal during scanning will be produced, so that the amount of phase shift imparted by the BPF 312 will not be constant during each 1 H interval. As a result during normal display operation, the timings at which the successive R, G and B portions of the point-sequential video signal of each scanning block is applied to the corresponding line cathode (determined by the 3-phase pulse signals of that scanning block, derived from the regenerated B timing signal as described hereinabove) will deviate from the timings at which R, G and B phosphor stripes are scanned by the electrode beams, so that accurate color reproduction cannot be obtained.

Figure 9A:
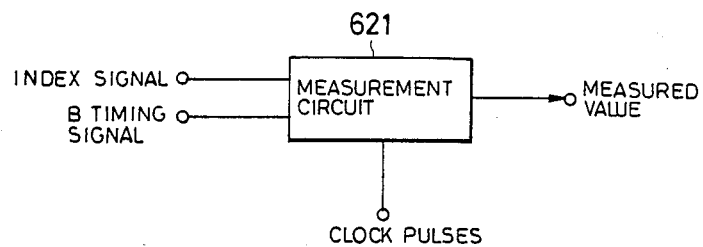
FIG. 9A is a block diagram to illustrate a circuit for measuring a time difference between an index signal and a B timing signal used in the system of FIG. 3A.
Figure 9B:
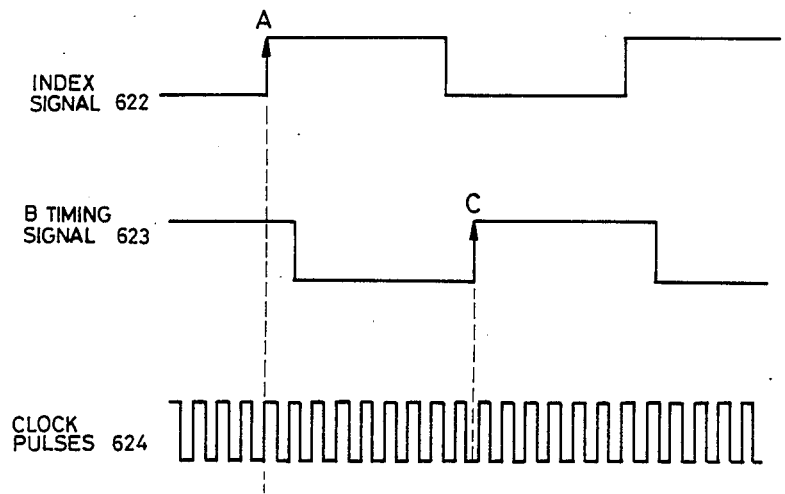
FIG. 9B is a waveform diagram corresponding to FIG.

The method of measuring a time differences between an index signal and the B timing signal, by each of the measurement circuits 314, 315 in FIG. 3A, will be described referring to FIGS. 9A and 9B. The index signal 622 (e.g. index signal 220A or 220B in FIG. 5), B timing signal 623, and a high-frequency clock signal 624 (produced from a clock signal source which has been omitted from FIG. 3A for simplicity of description) are respectively inputted to a measurement circuit 621, and the number of pulses of the clock signal 624 contained in each interval extending from a rising edge A of the index signal 622 and to then next rising edge C of the B timing signal 623 is measured. The resultant measured value is stored in the memory circuit 318 shown in FIGS. 3A and 3B It can be understood that, since the measurement precision is determined by the frequency of the clock signal, accuracy can be increased by using a clock signal of sufficiently high frequency. However if phase errors are introduced as a result of varying degrees of phase shift introduced by the BPF 332 in FIG. 4, the measured values themselves will not be accurate.

Figure 10:
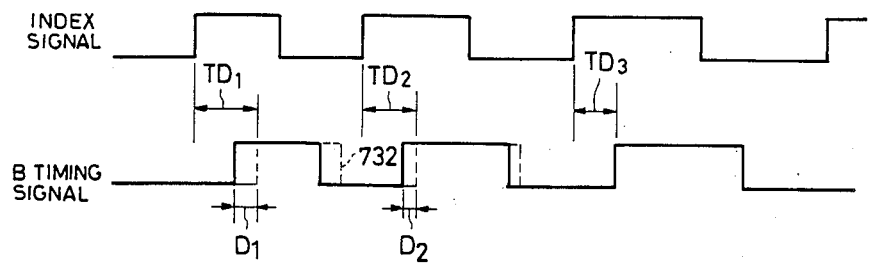
FIG. 10 is a waveform diagram for illustrating measurement errors which are produced by the measurement circuit of FIG. 9A; and, FIG. 11 is a partial circuit block diagram of an embodiment of the present invention for applying correction to measured timing values such as to compensate for errors produced as described referring to FIG. 10.

This is illustrated in FIG. 10, in which the full-line outline of the B timing signal waveform is that which would be produced at the output from limiter 333 in FIG. 4 if horizontal scanning were absolutely linear, so that there would be no variation in phase shift applied to the B timing signal by the BPF 332 during each 1 H interval. However timing errors in the B timing signal (i.e. the timings of rising edges of the B timing signal relative to rising edges of the index signal 220 from waveform shaping circuit 309) are actually produced, as indicated by the broken-line outline 732. Thus, timing errors $D_1$, $D_2$, . . . are introduced into the B timing signal before that signal is supplied to the measurement circuits 314, 315, and hence the measured values $TD_1$, $TD_2$, . . . that are obtained by the measurement circuits 314, 315 will be in error by the amounts $D_1$, $D_2$, . . . as shown.

Figure 11:
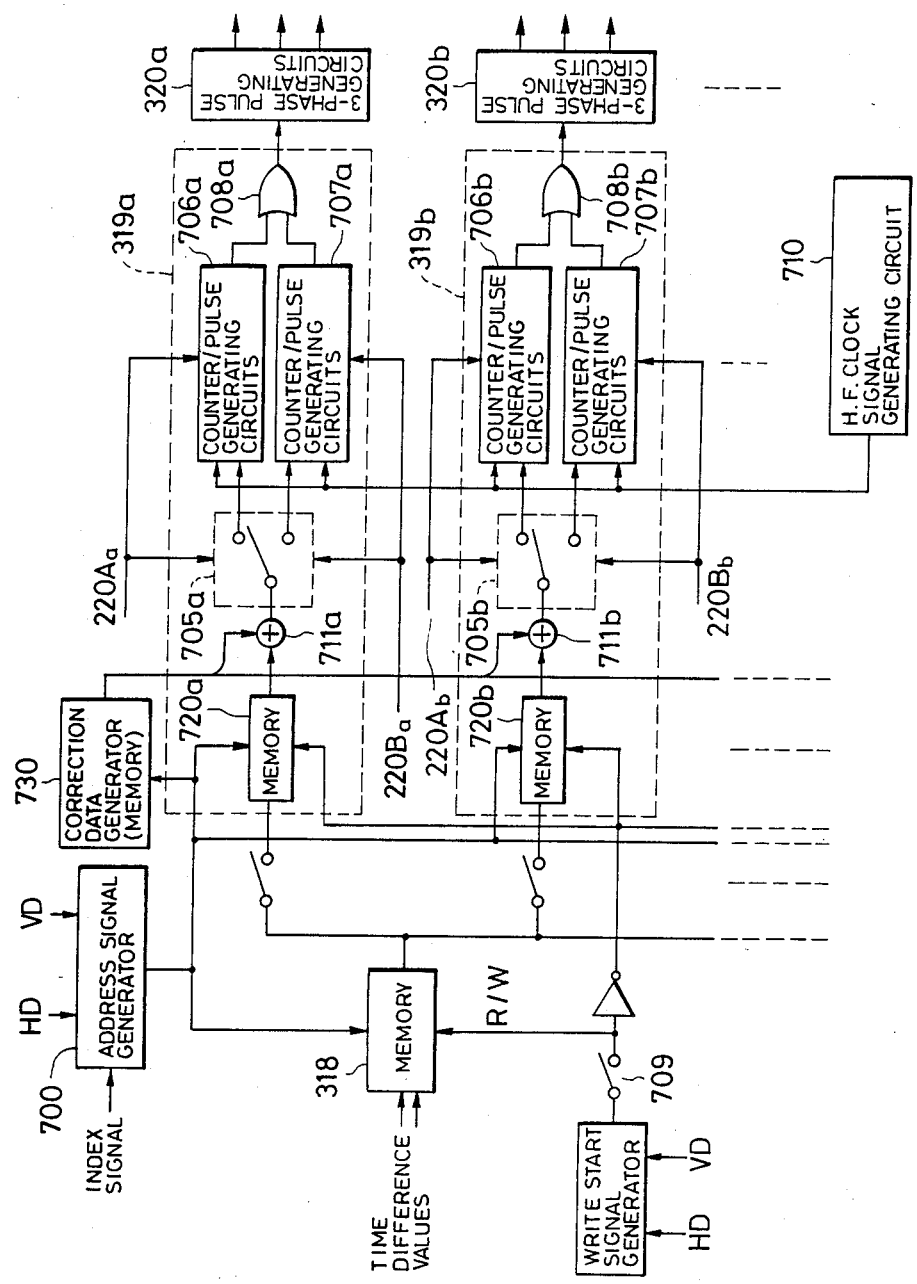

FIG. 11 is a block circuit diagram of an embodiment of the present invention for overcoming the problem described above. With this embodiment, data values representing the error amounts $D_1$, $D_2$, . . . are obtained by measurements performed at the stage of manufacture of the CRT drive system. These data values are obtained for each of the B timing signal pulses of each field and for each of the scanning blocks 303a to 303e, and respectively corresponding correction values are successively stored in a correction data generating circuit 730 which is essentially a memory circuit. The correction data generating circuit 730 must actually contain a set of memory regions respectively corresponding to the memory circuits 720a, 720b, . . . 720e shown in FIG. 3B, i.e. corresponding to each of the scanning blocks, and the memory map of each of these regions of the correction data generating circuit 730 is made identical to that of each of the memory circuits 720a, 720b, . . . 720e. Thereafter, during normal display operation, address signals from the address signal generator 700 are sequentially supplied to the correction data generating circuit 730 in addition to the memory circuits 720a, 720b, . . . 720e to execute read-out in parallel of successive correction values for each of the scanning blocks. These correction values are added to the time difference values which are read out from the corresponding memory circuits 720a, 720b, . . . 720e for each of the scanning blocks, in adders 711a, 711b, . . . 711e, to thereby compensate for the timing errors $D_1$, $D_2$, . . . described above. The correction values can be either positive or negative, so that correction by both addition and subtraction operation can be executed.

As a result, the timings of the output pulses produced from the counter/pulse generating circuits 706a, 707a etc. will be correct with respect to the index signals 220A, 220B, and hence correct timings will be ensured for the gate pulses produced from the 3-phase pulse generating circuits 320a, 320b, . . . 320e.

The above embodiment has been described for the case of executing correction at the stage of the memory/counter circuits 319a, 319b, . . . 319e. However it should be noted that it would be equally possible to execute correction of the measured time difference values prior to storing these values in memory 318 and then in the memory/counter circuits 319a, 319b, . . . 319e, or during transfer of stored time difference values from memory 318 to be written into 10 the memory/counter circuits 319a, 319b, . . . 319e.

This embodiment provides the advantage that the tolerance of linearity of electron beam scanning can be substantially relaxed. This enables, for example, a reduction of the overall power consumption of the CRT.

The above embodiments of the present invention have been described for the case in which a timing signal is utilized which is based on the B phosphor stripes of the CRT. However it would of course also be possible to utilize the G or the R phosphor stripes for this purpose.

It should also be noted that although the present invention has been described in the above for a color CRT having a plurality of cathodes for respective scanning blocks, the method of the invention is equally applicable to a color CRT having a single cathode.

Thus although the present invention has been described in the above with reference to specific embodiments, various modifications to the described embodiments may be envisaged, which fall within the scope claimed for the invention.

What is claimed is:

1. A method of controlling, in synchronism with electron beam scanning of successive fluorescent element color trios of a color cathode ray tube, timings of primary color components of a point-sequential video signal for driving a modulation electrode of the cathode ray tube, the method comprising:
    (a) deriving an index signal comprising, during each of successive horizontal scanning intervals of said electron beam scanning, a pulse train having a frequency identical to a trio frequency of said electron beam scanning;
    (b) deriving a scanning timing signal comprising, during each of said horizontal scanning intervals, a train of pulses respectively generated at timings coinciding with timings of electron beam scanning of a predetermined fluorescent element in corresponding ones of said color trios;
    (c) frequency dividing said index signal to obtain n-phase index signals comprising, during each of said horizontal scanning intervals, n pulse trains mutually differing in phase by 360/n degrees, where n is an integer of value greater than one;
    (d) measuring time differences between each of $(1+m \cdot n)^{th}$ pulses of said scanning timing signal and a pulse of a first one of said n-phase index signals, time differences between each of $(2+m \cdot n)^{th}$ pulses of said scanning timing signal and a pulse of a second one of said n-phase index signals, . . . and between each of $(n+m \cdot n)^{th}$ pulses of said scanning timing signal and a pulse of an $n^{th}$ one of said n-phase index signals, where m takes the values 0, 1, 2, . . . ;
    (e) storing said time differences as respective data values in memory means; and,
    (f) subsequently reading out said time difference values sequentially from said memory means and producing successive pulses at respective timings relative to said n-phase index signals that are determined by said time difference values, to thereby regenerate said scanning timing signal, and applying said scanning timing signal to control said primary color component timings of said video signal.

2. A method according to claim 1, in which said step (d) comprises:
    for each pulse of said scanning timing signal during a horizontal scanning interval, measuring respective time differences between said each pulse and a predetermined pulse edge of each of said n-phase index signals;
    comparing each of said time differences with a predetermined range of variation determined with respect to the corresponding n-phase index signal pulse edge, to obtain respective comparison decisions; and
    selectively storing said time differences in said memory means and ignoring said time differences, in accordance with said comparison decisions.

3. A method according to claim 2, in which limits of said comparison range during each of said horizontal scanning intervals are determined in accordance with a time difference value measured during an immediately preceding horizontal scanning interval.

4. A method according to claim 3 in which a lower one of said limits is determined as a difference between said time difference value measured during the preceding horizontal scanning interval and a predetermined value k, where k is a positive value which is less than a minimum period of said trio frequency, and an upper one of said limits is determined as a sum of said time difference value measured during the preceding horizontal scanning interval and said value k.

5. A drive method according to claim 1, in which said step (f) further comprises deriving from said regenerated scanning timing signal a set of 3-phase timing control signals comprising three pulse trains mutually differing in phase by 120°, each of identical frequency to said scanning timing signal and with one of said pulse trains coinciding in phase with said scanning timing signal, for respectively controlling timings of red, blue and green primary color components of said point-sequential video signal, and in which said 3-phase timing signals are generated by:

during each period between successive pulses of said regenerated scanning timing signal in a horizontal scanning interval, deriving a first pulse whose width is ⅓ of said period and which begins at the start of said period, and a second pulse whose width is identical to that of said first pulse and which begins at the end of said first pulse; and successively generating a first timing control signal pulse on a leading edge of said first pulse, a second timing control signal pulse on a trailing edge of said first pulse, and a third timing control signal pulse on a trailing edge of said second pulse.

6. A method according to claim 5, in which said first and second pulses of each scanning timing signal period are derived by:

(g) during each of said periods of the scanning timing signal in a first horizontal scanning interval of a scanning field, executing frequency division by a division factor ⅓ of a clock signal pulse train having a frequency substantially higher than said trio frequency, to produce frequency-divided clock pulses, counting a number of said frequency-divided clock pulses produced during said period, and storing said number as a data value in memory means, to thereby store in said memory respective data values for each of said scanning timing signal pulses of said first horizontal scanning interval;

(h) in a second horizontal scanning interval of said field, repeating said step (g) for each of the periods of said scanning timing signal during said second scanning interval while in addition successively reading out said stored values at timings respectively determined by corresponding scanning timing signal pulses produced during said second horizontal scanning interval, and for each value thus read out, counting a corresponding number of pulses of said clock signal pulse train, while initiating one of said first pulses at the start of said counting and terminating said first pulse at the end of said counting, and thereupon again counting said corresponding number of pulses while initiating one of said second pulses at the end of said first pulse, and terminating said second pulse at the end of said counting; and, (i) successively repeating said step (h) for the remaining horizontal scanning intervals of said field.

7. A method according to claim 1 and further comprising, for each of said scanning timing signal pulses, measuring respective values of delay deviation which are applied to said pulses in said step (b) of deriving said pulses, storing respectively corresponding correction values for compensation of said delay deviation values in correction data memory means, and subsequently sequentially reading out said correction values from said correction data memory means and applying said correction values to compensate said regenerated scanning timing signal for said delay deviation values.

8. A method according to claim 7, in which said correction values are added to respective ones of said time difference values after said time difference values are read out of memory in said step (f) of claim 1, to thereby obtain corrected time difference values.

9. A method according to claim 7, in which said correction values are added to respective ones of time difference values prior to storing said time difference values in memory in said step (e) of claim 1, to thereby obtain corrected time difference values to be stored in memory.

10. A method of controlling, in synchronism with electron beam scanning of successive fluorescent element color trios of a color cathode ray tube, timings of primary color components of a point-sequential video signal for driving a modulation electrode of the cathode ray tube, the method comprising:

deriving an index signal comprising, during each of successive horizontal scanning intervals of said electron beam scanning, at least a single-phase pulse train having a frequency identical to a trio frequency of said electron beam scanning;

deriving a scanning timing signal comprising, during each of said horizontal scanning intervals, a train of pulses respectively generated at timings coinciding with timings of electron beam scanning of a predetermined fluorescent element in corresponding ones of said color trios;

measuring time differences between each pulse of said scanning timing signal and a pulse of said index signal, and storing said time differences as respective data values in memory means;

subsequently reading out said time difference values sequentially from said memory means and producing successive pulses at respective timings relative to said index signal that are determined by said time difference values, to thereby regenerate said scanning timing signal;

deriving from said regenerated scanning timing signal a set of 3-phase timing control signals comprising three pulse trains mutually differing in phase by 120°, each of identical frequency to said regenerated scanning timing signal and with one of said pulse trains coinciding in phase with said regenerated scanning timing signal, for respectively controlling timings of red, blue and green primary color components of said point-sequential video signal, said 3-phase timing control signals being derived by;

during each period between successive pulses of said regenerated scanning timing signal in a horizontal scanning interval, deriving a first pulse whose width is ⅓ of said period and which begins at the start of said period, and a second pulse whose width is identical to that of said first pulse and which begins at the end of said first pulse; and successively generating a first timing control signal pulse on a leading edge of said first pulse, a second timing control signal pulse on a trailing edge of said first pulse, and a third timing control signal pulse on a trailing edge of said second pulse.

11. A method according to claim 10, in which said first and second pulses of each scanning timing signal period are derived by:

(j) during each of said periods of the scanning timing signal in a first horizontal scanning interval of a scanning field, executing frequency division by a division factor ⅓ of a clock signal pulse train having a frequency substantially higher than said trio frequency, to produce frequency-divided clock pulses, counting a number of said frequency-divided clock pulses produced during said period, and storing said number as a data value in memory means, to thereby store in said memory means respective data values for each of said scanning timing signal pulses of said first horizontal scanning interval;

(k) in a second horizontal scanning interval of said field, repeating said step (j) for each of the periods of said scanning timing signal during said second scanning interval, while in addition successively reading out said stored values timings respectively determined by corresponding scanning timing signal pulses produced during said second horizontal scanning interval, and for each value thus read out, counting a corresponding number of pulses of said clock signal pulse train, while initiating one of said first pulses at the start of said counting and terminating said first pulse at the end of said counting, and thereupon again counting said corresponding number of pulses while initiating one of said second pulses at the end of said first pulse, and terminating said second pulse at the end of said counting; and, (l) successively repeating said step (k) for the remaining horizontal scanning intervals of said field.

12. A method of controlling, in synchronism with electron beam scanning of successive fluorescent element color trios of a color cathode ray tube, timings of primary color components of a point-sequential video signal for driving a modulation electrode of the cathode ray tube, the method comprising:

deriving an index signal comprising, during each of successive horizontal scanning intervals of said electron beam scanning, at least a single-phase pulse train having a frequency identical to a trio frequency of said electron beam scanning;

deriving a scanning timing signal comprising, during each of said horizontal scanning intervals, a train of pulses respectively generated at timings coinciding with timings of electron beam scanning of a predetermined fluorescent element in corresponding ones of said color trios;

for each of said scanning timing signal pulses, measuring respective values of delay deviation which are applied to said pulses in a process of deriving said scanning timing signal, and storing in correction data memory means respectively corresponding correction values for compensation of said delay deviation values;

measuring time differences between each pulse of said scanning timing signal and a pulse of said index signal, and storing said time differences as respective data values in memory means;

subsequently reading out said time difference values sequentially from said memory means while concurrently reading out corresponding ones of said correction values from said compensation data memory means, adding said correction values to respective ones of said time difference values to obtain corrected time difference values, and producing successive pulses at respective timings relative to said index signal that are determined by said corrected time difference values, to thereby regenerate said scanning timing signal; and applying said regenerated scanning timing signal to control said primary color component timings of said video signal.

* * * * *